(12) United States Patent
Sennert et al.

(10) Patent No.: US 12,247,994 B2
(45) Date of Patent: Mar. 11, 2025

(54) GAS DENSIMETER

(71) Applicant: WIKA Alexander Wiegand SE & Co. KG, Klingenberg/Main (DE)

(72) Inventors: Philipp Sennert, Dorfprozelten (DE); Matthias Sausner, Weiterstadt (DE)

(73) Assignee: Wika Alexander Wiegand SE & Co. KG, Klingenberg (DE)

( * ) Notice: Subject to any disclaimer, the term of this patent is extended or adjusted under 35 U.S.C. 154(b) by 0 days.

(21) Appl. No.: 18/524,178

(22) Filed: Nov. 30, 2023

(65) Prior Publication Data
US 2024/0094105 A1   Mar. 21, 2024

Related U.S. Application Data

(62) Division of application No. 16/585,317, filed on Sep. 27, 2019, now Pat. No. 11,867,712.

(30) Foreign Application Priority Data

Dec. 18, 2018   (DE) .................... 10 2018 009 793.6

(51) Int. Cl.
*G01N 9/32*   (2006.01)
*G01N 9/26*   (2006.01)

(52) U.S. Cl.
CPC .............. *G01N 9/32* (2013.01); *G01N 9/266* (2013.01); *G01N 2291/02818* (2013.01)

(58) Field of Classification Search
None
See application file for complete search history.

(56) References Cited

U.S. PATENT DOCUMENTS

| | | |
|---|---|---|
| 2,662,394 A | 12/1953 | McMahon |
| 6,651,483 B1 | 11/2003 | Meyer |
| 7,257,496 B2 | 8/2007 | Rhodes |
| 7,937,985 B2 | 5/2011 | Chambon |
| 8,806,917 B2 | 8/2014 | Haibheer |
| 9,362,071 B2 | 6/2016 | Boucher |
| 2012/0118043 A1 | 5/2012 | Heckler et al. |

(Continued)

FOREIGN PATENT DOCUMENTS

| | | |
|---|---|---|
| CN | 207116321 U | 3/2018 |
| CN | 107968018 A | 4/2018 |

(Continued)

*Primary Examiner* — Daniel S Larkin
(74) *Attorney, Agent, or Firm* — Muncy, Geissler, Olds & Lowe, P.C.

(57) ABSTRACT

A gas densimeter for monitoring a pressure or density of a gas in a gas chamber with a housing having a first housing chamber and a measuring chamber, a first coupling, via which the measuring chamber can be connected to the gas chamber, at least one reference bellows, which is connected directly or indirectly in particular to a transmission element, and at least one transmitting and/or monitoring unit, which is or can be operatively connected directly or indirectly to the transmission element. In this regard, the measuring chamber has a gas-permeable connection to the gas chamber via the first coupling and the reference bellows forms a reference chamber filled with a constant amount of a reference gas. A surface section covering the reference chamber is provided or reachable at least partially within the first housing chamber or measuring chamber as a measuring surface for the gas from the gas chamber.

8 Claims, 20 Drawing Sheets

(56) References Cited

U.S. PATENT DOCUMENTS

2016/0320281 A1   11/2016  Haibheer
2016/0356687 A1   12/2016  Halbheer

FOREIGN PATENT DOCUMENTS

| CN | 207301823 U | 5/2018 |
|----|----|----|
| DE | DD 272 708 A1 | 10/1989 |
| DE | 10 2010 055 249 B4 | 4/2014 |
| DE | 10 2013 115 009 A1 | 7/2015 |
| DE | 10 2017 104 919 A1 | 9/2018 |
| EP | 2 796 852 A1 | 10/2014 |
| GB | 2226142 | 6/1990 |

GAS DENSIMETER

This nonprovisional application is a divisional of U.S. application Ser. No. 16/585,317 filed on Sep. 27, 2019, now U.S. Pat. No. 11,867,712, which claims priority under 35 U.S.C. § 119 (a) to German Patent Application No. 10 2018 009 793.6, which was filed in Germany on Dec. 18, 2018, and which are both herein incorporated by reference.

BACKGROUND OF THE INVENTION

Field of the Invention

The present invention relates to the technical field of gas density measurement and monitoring of gases in gas chambers, sealed gas-tight, with a constant volume.

Description of the Background Art

Gas densimeters are pressure gauges designed to measure and/or display the density of a gas in a gas chamber, sealed gas-tight, with a constant volume. Pressure changes due to temperature changes of the gas are compensated, for which a number of methods are known in the state of the art. By means of a temperature compensation, which must be adjusted to specific properties of a particular type of gas, a measured, compensated pressure becomes equivalent to a gas density and can also be converted or rescaled into such a gas density.

Gas densimeters, which additionally have a limit value signal transmitter to signal when values exceed or fall below a limit value, are also referred to as gas density monitors. Such gas density monitors usually have electrical contact devices to which external cabling can be connected, via which signals can be transmitted to an external control and/or regulating device.

Gas chambers filled with a gas whose density is to be monitored are typically characterized by a defined pressure value which can be associated with a normal operating state of the gas chamber. This pressure value is also referred to as nominal pressure, filling pressure, or operating pressure and is typically defined for a specific gas temperature.

To determine possible leakage or emission of the filling gas at an early stage, e.g., the density in the gas chamber is monitored with use of a gas density monitor and a corresponding limit value signal is triggered when the density falls below a defined limit value which is lower than the nominal pressure.

Gas densimeters and monitors are used, for example, in gas-insulated switchgears for medium-voltage and high-voltage technology, where monitoring the density of the insulating gas is essential for ensuring an insulating effect of the gas as well as for preventing environmentally harmful emissions of insulating gases. In particular, gas densimeters and monitors are used in this field to monitor gas chambers filled with sulfur hexafluoride (abbreviated as $SF_6$). $SF_6$ is a widely used insulating gas due to its physical properties.

Gas densimeters, gas density indicators, and gas density monitors are well known in general in the state of the art.

A temperature-compensated density monitor is known from EP 2 796 852 B1, which comprises a variable-volume chamber, which is connected to a gas chamber. The chamber expands when an applied pressure increases and in so doing presses against a spring. In this case, this is a shape memory spring. A temperature compensation is to be realized due to special properties of this spring.

A density monitor is known from CN 207116321 U which includes a variable-volume chamber filled with a reference gas. A temperature compensation is to be achieved thereby. The chamber is formed by two coaxially arranged bellows, one bellows enclosing the other bellows.

A gas density monitor is known from CN 107968018 A which comprises an arrangement of two bellows in a housing with two housing chambers. A first bellows is connected at one end to an inner wall section of a first housing chamber and sealed at the other end with a connecting element, and has a gas-permeable connection with a gas chamber. The first bellows thus forms a first chamber. A second bellows is also sealed at one end by the connecting member and at its other end is connected to another inner wall section of the first housing chamber. A second chamber, filled with a reference gas, is formed by the outer surfaces of the two bellows, the surfaces of the connecting element, and the inner walls of the first housing chamber. A temperature compensation is to be achieved in this way.

SUMMARY OF THE INVENTION

It is therefore an object of the present invention to provide a gas densimeter which is improved in comparison with the prior art.

According to a first aspect of the invention, a gas densimeter for monitoring a pressure or density of a gas in a gas chamber comprises a housing having a first housing chamber and a measuring chamber. Further, the gas densimeter comprises a first coupling, via which the measuring chamber can be connected to the gas chamber, at least one reference bellows, which is connected indirectly or directly, for example, to a transmission element, and at least one transmitting and/or monitoring unit, which is or can be operatively connected directly or indirectly to the transmission element. According to the invention, the measuring chamber has a gas-permeable connection to the gas chamber via the first coupling and the reference bellows forms a reference chamber filled with a constant amount of a reference gas. A surface section covering the reference chamber is provided or reachable at least partially within the first housing chamber or measuring chamber as a measuring surface for the gas from the gas chamber.

According to a second aspect of the invention, a gas densimeter for monitoring a pressure or density of a gas in a gas chamber comprises a housing, wherein the housing comprises at least one first housing chamber, wherein the first housing chamber forms a measuring chamber. Further, the gas densimeter comprises at least one first coupling, via which the gas densimeter can be connected to the gas chamber, and at least one first bellows, which can be referred to as a reference bellows, wherein the reference bellows is connected directly or indirectly at a first end section to a first inner wall section of the first housing chamber of the measuring chamber. Further, the gas densimeter comprises at least one separator, wherein the separator is connected directly or indirectly to a second end section of the reference bellows or is formed by this end section, at least one transmission element, which is connected directly or indirectly to the separator, and at least one transmitting and/or monitoring unit which can be operatively connected directly or indirectly to the transmission element. In this regard, the measuring chamber has a gas-permeable connection to the gas chamber via the first coupling and the reference bellows forms a reference chamber filled with a constant amount of a reference gas. In this case, the reference chamber is disposed at least partially within the first housing chamber and is separated from the measuring chamber in a gas-impermeable manner.

According to a third aspect of the invention, a gas densimeter for monitoring a pressure or density of a gas in a gas chamber comprises a housing, wherein the housing comprises at least one first housing chamber. Further, the gas densimeter comprises at least one first coupling, via which the gas densimeter can be connected to the gas chamber, and a first bellows, wherein the first bellows can be referred to as a reference bellows and is connected directly or indirectly at a first end section to a first inner wall section of the first housing chamber. Further, the gas densimeter comprises a second bellows, wherein the second bellows can be referred to as a measuring bellows and is connected directly or indirectly at a first end section to a second inner wall section of the first housing chamber. In addition, the gas densimeter comprises at least one separator, wherein the separator is connected directly or indirectly to a second end section of the reference bellows and to a second end section of the measuring bellows, or is formed by the second end section of the reference bellows or the second end section of the measuring bellows. Further, the gas densimeter comprises a transmission element, which is connected directly or indirectly to the separator, and at least one transmitting and/or monitoring unit which can be operatively connected directly or indirectly to the transmission element. In this case, the reference bellows forms a reference chamber filled with a constant amount of a reference gas, and the measuring bellows forms a measuring chamber and has a gas-permeable connection via the coupling to the gas chamber, wherein the measuring chamber and the reference chamber are separated from one another in a gas-impermeable manner.

In the present case, a housing can be understood to mean in particular a shell which comprises a housing part or a plurality of housing parts, for example, a base body and a cover and/or a bottom and/or a housing extension part. In the present case, a housing chamber can be understood as meaning in particular all internal volumes of a single-part or multipart housing which have a gas-permeable connection to one another.

The gas densimeter according to the first, second, or third aspect of the invention has the advantage of providing a modular structure with few components, low production costs, and a high reliability and operational safety.

In contrast to known gas densimeters and monitors, the gas densimeter of the invention can be easily produced with low production costs. Further, in contrast to gas densimeters and monitors known from the prior art, even in case of failure, signals and/or displays are realized that correspond to an actual state of the system and/or indicate a defect in the gas densimeter.

The gas densimeter in this case can be designed in particular for measuring and/or monitoring the density of a single- or multicomponent gas, wherein, for example, gases such as sulfur hexafluoride (abbreviated as $SF_6$), nitrogen, air, molecular gases, such as $(CF_3)_2CFCN$, or gas mixtures are possible.

For the three aspects of the invention, the insulating gas is introduced from the gas chamber into the measuring chamber via the coupling. The measuring chamber is formed here in the first and second aspect of the invention by the first housing chamber, and in the third aspect by the measuring bellows.

The insulating gas in the measuring chamber exerts a compressive force on a surface of the separator or of the component having the corresponding surface section.

The reference gas contained in the reference chamber, i.e., in the reference bellows, in turn exerts a compressive force on the opposite surface of the separator or the component having the corresponding surface section.

The system in this case strives toward a state in which there is an equilibrium of forces.

Whereas the compressive force on the one surface of the separator or of the component having the corresponding surface section is determined directly by the pressure of the introduced insulating gas, the compressive force on the opposite side of the separator or of the component having the corresponding surface section can be changed by the reference gas in that the volume of the reference chamber changes.

In this case, the reference bellows compresses or expands under the effect of the compressive forces on the surfaces of the separator or of the component having the corresponding surface section until an equilibrium of forces is present.

The translational motion that the separator or the component having the corresponding surface section undergoes during the compression or extension of the reference bellows is mechanically transmitted by the transmission element to the transmitting and/or monitoring unit.

If the pressure of the insulating gas from the gas chamber decreases, the reference bellows is stretched. The separator or the component having the corresponding surface section thus moves "upwards," for example. If, in contrast, the pressure of the insulating gas from the gas chamber increases, the reference bellows is compressed and the separator or the component having the corresponding surface section moves "downwards."

If the temperature of the gas in the gas chamber changes, this always leads to an increase in pressure, because the gas chamber is usually a container, closed gas-tight, with a constant volume. Likewise, cooling of the gas in the gas chamber leads to a pressure drop.

However, these pressure changes do not correspond to a change in the gas density, therefore, no gain or loss of gas that is to be monitored, however. These pressure changes caused by temperature changes must therefore be compensated.

This is realized by the enclosed reference gas in the reference chamber. This is in thermal contact with the gas chamber and the insulating gas via the wall of the reference bellows and the entire housing. When the temperature of both the insulating gas and the reference gas rises, i.e., in the thermal equilibrium between the measuring and reference chamber, the pressure in the reference chamber increases just as sharply as the pressure in the measuring chamber. As a result, temperature-induced pressure changes do not lead to a change in the compressive forces on the surfaces of the separator or the component having the corresponding surface section and the separator or component does not perform a translational motion.

The prerequisite for an accurate temperature compensation is that as the temperature changes, the reference gas experiences the same pressure increase as the insulating gas. Thus, for example, precisely the gas that is also present in the gas chamber is used as the reference gas.

Possible exemplary embodiments of the gas densimeter, which are described below, can be applied to all three aspects of the invention.

In a possible embodiment of the gas densimeter, it is designed to be installed on a gas chamber, wherein the gas chamber is understood in particular to be a closed gas chamber, therefore, sealed from the atmosphere, in or on an electrical switching device, which is filled with a gas under a certain pressure. This enables easy installation of the gas densimeter on such a switching device and a particularly reliable measurement and/or monitoring of the density of the gas.

In a further possible embodiment of the gas densimeter, its housing is formed in one piece or assembled from multiple parts. For example, the housing or parts of the housing are made of metallic materials, such as, for example, brass, aluminum, steel, or stainless steel. However, parts of the housing can also be formed of a plastic, a ceramic, a composite, or a glass. Thus, resistance of the housing to different media can be easily adapted.

In a further possible embodiment of the gas densimeter, it is provided that the at least one first housing chamber is formed as a cavity in the housing, which has a gas-permeable connection to the coupling but is otherwise sealed against the atmosphere and/or other housing chambers. The housing chamber, for example, has a cylindrical shape that can be easily and inexpensively manufactured. In the case of a cylindrical shape, the gas-permeable connection to the coupling can be disposed on a wall section of the circumferential surface or on one of the flat end faces of the cylindrical shape.

In a further possible embodiment of the gas densimeter, the coupling is formed as a connection for the installation of the gas densimeter on a gas chamber. Such a connection can be realized, for example, by an internal or external thread, by a flange connection, or by a plug-in coupling. The coupling can also be provided with a self-sealing valve so that the connection to the measuring chamber is shut off when the coupling is disconnected or detached from a mating coupling that opens the coupling on the gas chamber. The coupling can also be designed to open a self-sealing valve on the mating coupling on the gas chamber. The coupling enables a reliable, safe, and easy coupling of the gas densimeter to a gas chamber.

In a further possible embodiment of the gas densimeter, it is provided that the reference bellows is connected directly or indirectly at its first end section to a first inner wall section of the first housing chamber or the measuring chamber. This connection is a gas-impermeable and thus gas-tight connection, for example, a welded connection, a soldered connection, a clamped or pressed connection, a glued connection, a screwed connection, or a connection with a sealing element. Thus, tightness of the connection is ensured in a simple and reliable manner. It is provided thereby that the first inner wall section in this embodiment does not surround the inner wall region in which there is the connection between the first housing chamber and the coupling.

In a further possible embodiment of the gas densimeter, the reference bellows is indirectly connected to an inner wall section of the measuring chamber in that a housing extension part makes the connection. The housing extension part can have, for example, a cup, hat, or pot shape and be connected to the housing, in particular to close an opening in the housing wall. The result of such an arrangement is that the measuring chamber is disposed only partially within the corresponding housing chamber or even only the transmission element projects into the measuring chamber. Thus, the measuring chamber can be designed particularly compact. The measuring chamber is also particularly easy to manufacture and install.

In a further possible embodiment, the particular bellows, if its respective end section forms the separator, is closed as a single piece at least at one end.

In a further possible embodiment of the gas densimeter, it is provided that the separator is formed as a plate-shaped, in particular disk-shaped or plate-shaped, one-piece or multipart element. Such a disk or plate shape results in the advantage that it can be easily connected to an end section of a bellows with a round cross section. A multipart design, for example, is understood to mean that a connection between the separator, reference bellows, and transmission element can each also be formed indirectly and additional supplementary components, such as connecting rings or the like can be associated with, for example, the separator as a multipart separator.

The separator or parts of the separator are formed, for example, of metallic materials, such as, for example, brass, aluminum, steel, or stainless steel. However, the separator or parts of the separator can also be formed of a plastic or a composite material. Furthermore, it can be provided in this embodiment that a connection between the separator and the second end section of the reference bellows is in particular a gas-impermeable and thus gas-tight connection, for example, a welded connection, a soldered connection, a clamped or pressed connection, a glued connection, a screwed connection, or a connection with a sealing element. Thus, tightness of the connection is ensured in a simple and reliable manner. The design features of this gas-tight connection can also be transferable to an inner wall section of the first housing chamber with respect to a connection of the separator to a second end section of a measuring bellows and to a connection of a first end section of the measuring bellows. It applies in this case, however, that the various connections between the bellows, the separator, and the various inner wall sections within an embodiment need not be identical or be manufactured in the same way.

In a further possible embodiment of the gas densimeter, it is provided that the transmission element is designed as a one-piece element, such as, for example, a pin, rod, plunger, or rack. Alternatively, it is provided that the transmission element is designed as a multipart element comprising at least two members and at least one joint, a hinge, or a suspension or bearing. Further, it can be provided that the indirect or direct connection between the transmission element and separator is a detachable or flexible connection, such as a screwed connection, a movable bearing, or a plug connection. However, a non-detachable connection can also be provided, such as, for instance, a welded connection or an adhesive connection. A multipart design of the transmission element with a joint or the like has the advantage that a movement of at least one of the bellows and/or the separator can be selectively transmitted to a transmitting and/or monitoring unit in the case of more complex housing designs as well.

In a further possible embodiment of the gas densimeter, it is provided that the transmitting and/or monitoring unit is designed as a multipart unit with a mechanism and a display device with a pointer and/or as a multipart unit with switching elements and contact devices. A current gas density value can be read on the gas densimeter by means of the display device at any time on site. A multipart unit with switching elements and contact devices is capable of triggering an electrical signal at predetermined density limits, said signal which can be detected via electrical lines by an external control unit, so that remote monitoring can be realized.

In a further possible embodiment of the gas densimeter, it is provided that the operative connection between the transmission element and the transmitting and/or monitoring unit comes about in that the transmission element comes into mechanical contact with the transmitting and/or monitoring unit or a part of the transmitting and/or monitoring unit, in particular transmits a force or torque to the transmitting and/or monitoring unit or a part of the transmitting and/or monitoring unit or transmits a movement via a rack and pinion gear. It can also be provided, however, that the operative connection between the transmission element and the transmitting and/or monitoring unit comes about by the operative connection taking place without contact, for example, by electromagnetic interaction, with the aid of a magnetostrictive position sensor or by optical detection.

In a further possible embodiment of the gas densimeter, it is provided that the reference bellows in the direct or indirect connection of its first end section to the first inner wall section of the first housing chamber or the measuring chamber and in the direct or indirect connection of its second end section to the separator forms a reference chamber with a variable volume which is sealed against the atmosphere, the first housing chamber, and/or further housing chambers. In other words, the reference bellows is formed as a closed reference chamber, wherein its one open end is closed by the connection to the housing inner wall and its other open end by the connection to the separator. Further, it can be provided that a constant amount of a reference gas is enclosed in the reference chamber. A constant amount in this context can mean a constant amount of material, therefore, a constant amount of particles or a constant mass. The reference gas can be, for example, of the same type or of the same mixture as the gas in the gas chamber whose density is to be monitored by the gas densimeter. In other words, for example, the same gas as the insulating gas to be monitored is used as the reference gas. For example, both gases have nearly the same, in particular identical thermal expansion behavior.

In a possible embodiment of the gas densimeter according to the first aspect, the surface section covering the reference bellows has an effective measuring surface which is smaller by 2% to 80%, in particular by 5% to 50%, in particular by 10% to 45%, in particular by 15% to 30% than a cross-sectional area of the reference bellows or the surface section covering the reference bellows. In other words, the insulating gas from the gas chamber can no longer press against the entire surface of the corresponding surface section in the measuring chamber. The resulting compressive force is therefore smaller than if it were to act on the entire surface. However, the reference gas within the reference chamber can press against the entire surface of the corresponding surface section, at least within the diameter of the reference bellows. This means that in the equilibrium of forces a lower pressure is established in the reference chamber than in the measuring chamber. This has the advantage that the pressure in the reference chamber increases in the failure case of a leak between the measuring and reference chamber and the consequent gradual pressure equalization between the chambers. However, this then leads to a translation of a component having the surface section, which is equivalent to a pressure drop in the measuring chamber without faults. In combination with a measuring range extension to low pressures with a spring element provided according to an embodiment, this results in that from a certain point, the pressure of the insulating gas falls below the pressure in the reference chamber. However, the amount of gas in the reference chamber, the ratio of the free surfaces against which the insulating gas and the reference gas press, and the spring strength of the spring element can then be advantageously adjusted so that the pressure in the reference chamber is at least lower than the pressure in the measuring chamber when the measuring chamber pressure corresponds to a normal operating pressure of the system.

In a further possible embodiment of the gas densimeter according to the first aspect, the component having the surface section is formed, for example, by means of the already described separator or the component comprises such a separator or the separator comprises the component.

In a further possible embodiment of the gas densimeter according to the first aspect, the reference bellows has a diameter of 20 mm to 70 mm or of 30 mm to 63 mm or of 35 mm to 55 mm.

In a further possible embodiment of the gas densimeter according to the first aspect, the reference bellows has an effective measuring surface or cross-sectional area perpendicular to the axis of the transmission element, wherein the cross-sectional area has an area of 3 $cm^2$ to 40 $cm^2$ or of 7 $cm^2$ to 30 $cm^2$ or of 10 $cm^2$ to 25 $cm^2$.

In a further possible embodiment of the gas densimeter according to the first aspect, a pressure of the reference gas in the reference bellows in a normal operating state of the gas chamber is lower by 0.05 bar to 2.5 bar or by 0.5 bar to 1.0 bar or by 0.2 bar to 0.5 bar than the connected pressure of the gas chamber. This makes it possible for a defect in the gas densimeter, which leads to a gas-permeable connection between the reference chamber and the first housing chamber, to be detected particularly easily.

In a further possible embodiment of the gas densimeter according to the first aspect, the reference bellows is completely surrounded gas-tight by the housing or the housing chamber.

In a further possible embodiment of the gas densimeter according to the first aspect, the transmitting and/or monitoring unit comprises at least one switching element, wherein the at least one switching element is actuated indirectly or directly by means of the transmission element when a pressure equalization takes place between the measuring chamber and the reference chamber. It is achieved by means of the switching element that an electrical switching signal signals that a limit pressure has been reached, whereby, for example, remote monitoring becomes possible.

In a further possible embodiment of the gas density meter according to the first aspect, at least one first spring element is provided, which exerts a spring force on the reference bellows, which force counteracts an extension of the reference bellows. Alternatively or in addition, at least one second spring element is provided, which exerts a spring force on the reference bellows, which force counteracts a compression of the reference bellows. This results in the advantage that the measuring range of the gas densimeter can be extended either in the direction of low pressures or in the direction of high pressures. Without a spring element and the force effect of the spring element, the measuring range of the gas densimeter would have to be limited to a narrow range of a few bars, because the reference bellows can only perform a limited extension or compression elastically. With the addition of the spring force, the extension or compression of the reference bellows or the associated change in the reference chamber volume and the resulting pressure change in the reference chamber, which is necessary to achieve an equilibrium of forces for a given pressure in the measuring chamber, can be reduced in one direction. In other words, in addition to the compressive forces, spring forces act on one or both surfaces of the component with the surface section. These are linearly dependent on the compression of the spring element. The translation, necessary for an equilibrium of forces, of the component with the surface section and the associated change in the reference chamber volume can be reduced by a spring being increasingly compressed and thereby exerting an ever-greater spring force on the component with the surface section.

If, for example, the spring element is disposed such that it presses from "above" on the component with the surface section, it is increasingly compressed when the pressure drops in the measuring chamber located above. The compressive force of the reference gas thus not only presses against a falling compressive force of the insulating gas, but also against an increasing spring force. The spring element is dimensioned so that an equilibrium of forces is still possible thereby with an unchanged maximum extension of the bellows and a defined lowest insulating gas pressure.

In a possible embodiment of the gas densimeter according to the second aspect, it is provided that the interior of the first housing chamber, which is separated from the reference chamber by the reference bellows, by the direct or indirect connection of the first end section of the reference bellows with the first inner wall section of the first housing chamber or measuring chamber, and by the indirect or direct connection of the second end section of the reference bellows with the separator, forms a measuring chamber with a variable volume and has a gas-permeable connection with the gas chamber via the coupling. This means that the measuring chamber is created in particular by a separation of the reference bellows by its connection to the housing inner wall and the separator from the housing chamber.

In a possible embodiment of the gas densimeter according to the third aspect of the invention, it is provided that the measuring bellows in the direct or indirect connection of its first end section to a first inner wall section of the first housing chamber and in the direct or indirect connection of its second end section with the separator forms a measuring chamber with a variable volume, which is sealed from the atmosphere, the first housing chamber, and/or further housing chambers, and the reference bellows and has a gas-permeable connection with the gas chamber via the coupling.

In a further possible embodiment of the gas densimeter, the transmitting and/or monitoring unit comprises at least one switching element and, for each switching element, at least one electrical contact device associated with the switching element. The at least one switching element can be actuated indirectly or directly by the transmission element and the at least one electrical contact device is electrically connected to the switching element and is accessible from outside the housing. In particular, the at least one switching element is actuated at a predetermined limit pressure by means of the separator, so that an electrical switching signal signals that a limit pressure has been reached, whereby, for example, remote monitoring becomes possible.

In a further possible embodiment of the gas densimeter, it is provided that the transmitting and/or monitoring unit additionally comprises at least one radio device which is connected to at least one switching element and which detects the switching state of the switching element and transmits this as a radio signal. Thus, expensive cabling can be omitted, so that space requirements and installation costs can be reduced. Further, this results in the advantage that the gas densimeter can also be used as a gas density monitor. A gas density limit value critical for the operation of the gas chamber can be assigned to the at least one switching element and monitored via an electrical line or via a radio link.

In order to enable a compact design of the gas densimeter, an individual setting and/or adjustment of each switching point, and a cost-effective production, it is provided in a further possible embodiment of the gas densimeter that the switching element is designed as a mechanical switch, in particular a microswitch or contact switch, and is operatively connected indirectly or directly to the transmission element such that the transmission element actuates the switching element mechanically. Further, it can be provided that the switching element is disposed, for example, on a carrier element, in particular on a carrier board. The transmission element can, for example, comprise an actuating element, which in particular is also designed in the form of a board or in the form of an arm, a plate, or a disk. Further, the transmission element can have, for each switching element included in the transmitting and/or monitoring unit, at least one associated contact unit which is adjustable in its position relative to the transmission element and/or relative to the actuating element. In an embodiment of this refinement, it can also be provided that the switching element is designed to be operatively connected without contact with the transmission element and thus to work frictionlessly and in particular without wear. The switching element can comprise, for example, a reed switch or a Hall element, wherein the transmission element comprises an actuating element which generates a magnetic field, wherein the magnetic field actuates the reed switch or is detected by the Hall element.

In a further possible embodiment of the gas densimeter, it is provided that the contact devices associated with the at least one switching element or the plurality of contact devices associated with the different switching elements are electrically connected to the switching element or elements via cable connections or traces on a circuit board. In this case, a contact device can comprise two individual contacts which are each connected to a switching element and are electrically connected to one another when the switching element is actuated and are not electrically connected to one another when the switching element is not actuated, or vice versa. It can be provided further that all contact devices are combined in a mutual plug assembly and are accessible via it from outside the housing, i.e., can be easily electrically contacted. Further, it can also be provided that multiple contact devices share a mutual single contact, which is connected to multiple switching elements. As a result, the number of required individual contacts can be reduced.

A maximum extension and compression that a reference bellows can elastically perform are limited. This has the result that gas density monitors from the prior art can accurately measure only in a narrow pressure range, in which an equilibrium of forces can be established by the elastic compression and extension of the bellows.

In order to expand a possible measuring range in one or both directions, it is provided in a further possible embodiment of the gas densimeter that it comprises at least one first spring element. It is provided in particular that the first spring element is disposed within the first housing chamber and/or within the reference chamber and/or within the measuring chamber and/or substantially parallel to the longitudinal axis of the reference bellows. A first end section of the first spring element can be indirectly or directly in mechanical contact with the separator and/or a second end section of the first spring element can be indirectly or directly in mechanical contact with a third inner wall section of the first housing chamber.

This results in the advantage that the measuring range of the gas densimeter can be extended either in the direction of low pressures or in the direction of high pressures. Without a spring element and the force effect of the spring element, the measuring range of the gas densimeter would have to be limited to a narrow range of a few bars, because the reference bellows can only perform a limited extension or compression elastically. With the addition of the spring force, the extension or compression of the reference bellows or the associated change in the reference chamber volume and the resulting pressure change in the reference chamber, which is necessary to achieve an equilibrium of forces for a given pressure in the measuring chamber, can be reduced in one direction.

In other words, in addition to the compressive forces, spring forces act on one or both surfaces of the separator. These are linearly dependent on the compression of the spring element. The translation, necessary for an equilibrium of forces, of the separator and the associated change in the reference chamber volume can be reduced by a spring being increasingly compressed and thereby exerting an ever-greater spring force on the separator.

If, for example, the spring element is disposed such that it presses from "above" on the separator, it is increasingly compressed when the pressure drops in the measuring chamber located above. The compressive force of the reference gas thus not only presses against a falling compressive force of the insulating gas, but also against an increasing spring force. The spring element is dimensioned so that an equilibrium of forces is still possible thereby with an unchanged maximum extension of the bellows and a defined lowest insulating gas pressure.

In order to achieve the aforementioned advantages for different installation situations, it is provided in a further possible embodiment of the gas densimeter that the spring element is formed as a coil spring, plate spring, spiral spring, or leg spring. It can be provided further that the spring element is formed as a bellows, disc spring, or sleeve spring. The spring element or parts of the spring element can be formed of a metallic material or of a plastic.

In a further possible embodiment of the gas densimeter, an end section of the spring element is a region of the body of the spring element which is in the vicinity of a point of the spring element at which a force or mechanical stress is introduced into the spring element or transferred from it to another body.

In a further possible embodiment of the gas densimeter, it is provided that the direct or indirect mechanical contact, which a respective end section of the spring element has with the separator or with the second inner wall section of the first housing chamber, is created by clamping the spring element between the separator and the third inner wall section. Further, it can be provided that the separator comprises a spring element receptacle, wherein the spring element receptacle is designed to fix the spring element in an arrangement and/or to prevent a rotation and/or displacement of the spring element relative to the separator. Further, a spring element receptacle can also be provided on the third inner wall section. A spring element receptacle on the separator and/or on the third inner wall section secures the spring element in a predetermined location and/or position and can in particular comprise a groove into which an end section of the spring element can be fitted or inserted. It can be provided further that the direct or indirect contact is realized by a non-detachable connection, such as, for example, by a welded connection, a soldered connection, an adhesive connection, or a clamping connection. In such a clamping connection, in which the spring element is clamped, for example, between the separator and an inner wall section, therefore, is pretensioned, a function and effect of the spring element can be designed especially precisely and the spring element is secured in its position at the same time against wobbling, vibration, and slipping.

In a further possible embodiment of the gas densimeter, the housing comprises at least one second housing chamber, wherein there is a connection opening in a partition wall between the at least two housing chambers, and wherein the transmission element projects from the first housing chamber through the connection opening into the second housing chamber. In this regard, the housing chambers are sealed against one another and the transmission element has a cross-sectional area that is smaller than the cross-sectional area of the first bellows.

This results in the advantage that components of the gas densimeter, which need not necessarily be disposed in the first housing chamber, can be disposed in the second housing chamber. These components are not exposed to contact with the gas from the gas chamber. As a result, the requirements for the components with respect to media resistance are significantly reduced and the gas densimeter is simpler and less expensive to manufacture. The structure is also simplified and modularized.

If the transmission element is fed out of the first housing chamber either with a seal or surrounded by a separating bellows, that is, the measuring chamber, this has the consequence that the insulating gas can no longer press against the complete surface of the separator from the gas chamber into the measuring chamber. The resulting compressive force is therefore smaller than if it were to act on the entire surface. However, the reference gas within the reference chamber can press against the entire surface of the separator, at least within the diameter of the reference bellows. This means that in the equilibrium of forces a lower pressure is established in the reference chamber than in the measuring chamber.

This has the advantage that the pressure in the reference chamber increases in the failure case of a leak between the measuring and reference chamber and the consequent gradual pressure equalization between the chambers. However, this then leads to a translation of the separator, which is equivalent to a pressure drop in the measuring chamber without faults. In combination with the measuring range extension to low pressures with a spring element, this results in that from a certain point, the pressure of the insulating gas falls below the pressure in the reference chamber. However, the amount of gas in the reference chamber, the ratio of the free surfaces against which the insulating gas and the reference gas press, and the spring strength of the spring element can then be advantageously adjusted so that the pressure in the reference chamber is at least lower than the pressure in the measuring chamber when the measuring chamber pressure corresponds to a normal operating pressure of the system.

In a further possible embodiment of the gas densimeter, the second housing chamber has a gas-permeable connection with the atmosphere or is itself also sealed off from the atmosphere. Emission of the gas from the gas chamber into the second housing chamber and/or the atmosphere is prevented by the seal between the first and second housing chamber.

In a further possible embodiment of the gas densimeter, it is provided that the connection opening between the housing chambers is formed by a direct through hole in the partition wall. This facilitates the manufacturability of the gas densimeter. However, the connection opening can also be made as a connection line, which can be formed of multiple subsections with different directions. A partition wall can be understood to be all parts of the housing that adjoin at least one of the housing chambers and prevent a gas-permeable connection between the housing chambers.

With regard to the second aspect of the invention, it is provided in an advantageous embodiment that it is predetermined by a ratio of cross-sectional areas of the transmission element and separator or by a ratio of the cross-sectional areas of the transmission element and reference bellows that the pressure in the reference chamber and the pressure outside the reference chamber, therefore, within the measuring chamber, act on surfaces of different sizes, which are perpendicular to the longitudinal axis of the bellows. For example, it is provided that the pressure in the reference chamber acts on a larger surface perpendicular to the longitudinal axis of the bellows than the pressure in the measuring chamber. The ratio of the pressures in the two chambers can be adjusted thereby in a simple and reliable manner according to application-specific requirements.

With regard to the third aspect of the invention, it is provided in an advantageous embodiment that is predetermined by a ratio of the cross-sectional areas of reference bellows and measuring bellows that the pressure in the reference chamber and the pressure within the measuring chamber act on surfaces of different sizes, which are perpendicular to the longitudinal axis of at least one bellows. For example, it is provided that the pressure in the reference chamber acts on a larger surface perpendicular to the longitudinal axis of the bellows than the pressure in the measuring chamber. For example, the bellows are arranged collinear in this case. The ratio of the pressures in the two chambers can be adjusted thereby in a simple and reliable manner according to application-specific requirements.

In a further possible embodiment of the gas densimeter, the first and second housing chamber are sealed against one another in that a sealing element is provided, which is sealingly arranged between the connection opening and the transmission element projecting through the connection opening. The sealing element can be a plastic seal, for example, an O-ring, an X-ring, another sealing ring, or a plain bearing. The use of a seal has the advantage that it is easy to integrate and few components are needed.

In a further possible embodiment of the gas densimeter, the first and second housing chambers are sealed from one another in that a further bellows is provided, which is connected directly or indirectly to the separator and to a partition wall section such that it surrounds the transmission element at least partially and the connection opening between the housing chambers lies within the partition wall section. Such a bellows can be referred to as a separating bellows, because in this arrangement, the first and second housing chambers are separated from one another and sealed by the separating bellows. This embodiment has the advantage that a particularly high tightness of the first housing chamber with respect to the atmosphere and with respect to other housing chambers is ensured. In addition, this solution is less subject to wear than a seal in the connection opening, which is heavily stressed by the static friction and sliding friction at the transmission element.

With regard to the second aspect of the invention, it is provided in an embodiment that a separating bellows for separating and sealing the housing chambers from one another is provided, which has a smaller diameter than the reference bellows. Thus, the separating bellows can also be used to set the pressure in the reference chamber and the pressure in the measuring chamber to act on surfaces of different sizes, which are perpendicular to the longitudinal axis of the reference bellows, as already explained in a previous section with respect to the cross-sectional area of the transmission.

In a further possible embodiment of the gas densimeter, it is provided that the reference bellows and/or the measuring bellows and/or the separating bellows are/is configured as a flexible body. In particular, each bellows in the context of the present invention and its refinements can be designed in the form of a corrugated bellows, corrugated pipe, diaphragm bellows, corrugated hose, or a similar shape. A bellows can be made of a metallic material, such as steel, stainless steel, brass, or aluminum, or of a plastic or composite material. A bellows can furthermore have a cylindrical shape and thus a round cross section or a different cross-sectional shape as well.

For any bellows within the scope of the present invention, the end sections of a bellows are understood to mean regions of a bellows wall that are near the open ends of a bellows. These regions comprise in particular end edges of the bellows. It can be seen from the geometry of a bellows that each bellows has two end sections located at opposite ends of the bellows.

Furthermore, the design features of a gas-tight connection, as described in the previous sections relating to the connection between the end sections of the reference bellows and the separator or an inner wall section, can also be applied to the connections of the end sections of the separating bellows with the separator or a partition wall section.

The separating bellows, reference bellows, and/or measuring bellows in each embodiment can be formed of different lengths, different diameters, different shapes, and/or of different materials or can be identical in one or more of the aspects mentioned.

In a further possible embodiment of the gas densimeter, the constant amount of reference gas in the reference chamber is adjusted such that when the gas densimeter is subjected to a first pressure, which can be associated with a normal operating state of the gas chamber, a second pressure that is lower than the first pressure is established in the reference chamber in the equilibrium of all acting compressive forces, mechanical stresses, and/or spring forces. The different selected surfaces, which were described in the preceding sections and are perpendicular to the longitudinal axis of the reference bellows and on which the pressure in the reference chamber and the pressure in the measuring chamber can act, have a significant influence on this.

Subjecting the gas densimeter to pressure means that a pressure is introduced via the coupling into the measuring chamber of the gas densimeter, said pressure being present in the first housing chamber according to the second aspect of the invention or being present in the measuring bellows according to the third aspect of the invention.

The pressure difference described results in the advantage that if there is a defect in the gas densimeter, which leads to a gas-permeable connection between the reference chamber and the measuring chamber, the pressure in the reference chamber rises and does not drop. As a result, the ratio of the forces acting on the separator or on the reference bellows changes and the bellows performs a movement or undergoes a volume change, which would come about without the defect only by a drop in the applied pressure in the measuring chamber. The movement of the first bellows is transmitted via the transmission element to the transmitting and/or monitoring unit. The defect thus leads to an effect on the transmitting and/or monitoring unit, which is interpreted as a drop in the applied pressure, therefore, the pressure in the gas chamber. As a result, the operator of the gas chamber becomes aware of the fault more quickly and can determine a defect in the gas densimeter more quickly.

In a further possible embodiment of the gas densimeter, the transmitting and/or monitoring unit comprises a display device with a pointer element and a mechanism. The transmission element is operatively connected directly or indirectly to the mechanism and a movement of the transmission element leads via the mechanism directly or indirectly to a movement of the pointer element. This has the advantage that the measured and/or monitored gas density can be read directly on the gas densimeter.

In a further possible embodiment of the gas densimeter, it is provided that the display device comprises a dial and a viewing window. The display device can be arranged so that the viewing window forms a section of the outer surface of the housing and the viewing window offers a view of the dial and the pointer element. The pointer element can be designed to move relative to the dial and/or the housing. This movement can be in particular a rotation about an axis of rotation, wherein the axis of rotation is substantially perpendicular to the dial plane or parallel to the dial plane.

In a further possible embodiment of the gas densimeter, it is provided that the mechanism is designed to convert a movement of the transmission element into a controlled movement, in particular rotation of the pointer element.

In a further possible embodiment of the gas densimeter, the at least one switching element and the transmission element are arranged and can be operatively connected indirectly or directly to one another such that the switching element is actuated indirectly or directly by the transmission element when the gas densimeter is subjected to a pressure equal to or greater than a limit pressure. If the applied pressure drops below the limit pressure, the switching element is no longer actuated directly or indirectly by the transmission element.

In this context, the limit pressure can also be referred to as the switching point of the gas densimeter. The arrangement according to this embodiment of the invention has the advantage that the switching element is always actuated when the applied pressure is greater than the limit pressure, therefore, greater than the switching point. If there is a defect in the electrical connection between the switching element and the electrical contact device or, as is more often the case in practice, there is a defect in an external electrical cabling outside the gas densimeter, this has the same effect on the signal transmission to the external control and/or regulating device as a drop in the applied pressure below the limit pressure. As a result, such a defect can be detected immediately.

In a further possible embodiment of the gas densimeter, it comprises a second spring element, wherein the first spring element and the second spring element indirectly or directly exert spring forces on the separator. The second spring element is disposed here, for example, within the first housing chamber and/or within the reference chamber and/or within the measuring chamber and/or at least substantially parallel to the longitudinal axis of the first bellows. A first end section of the second spring element can be in indirect or direct mechanical contact with the separator and/or a second end section of the second spring element is in indirect or direct mechanical contact with a fourth inner wall section of the first housing chamber. By means of this second spring element, the spring forces can also be generated on one or both surfaces of the separator with the above-described effects and advantages of the first spring element.

In a further possible embodiment of the gas densimeter, all or some of the features of the first spring element, the third inner wall section, and the mechanical contact between the end sections of the first spring element and other elements described in the preceding sections apply analogously to the second spring element, the fourth inner wall section, and the mechanical contact between the end section of the second spring element and other elements.

In a further possible embodiment of the gas densimeter, it is provided that the first spring element and the second spring element are arranged such that they exert a force on the separator substantially in the opposite direction. Furthermore, it can be provided that the first spring element and the second spring element are pretensioned in their arrangement. This results in the advantage that the gas densimeter shows a reduced hysteresis during the measuring operation and in addition the measuring range can be extended simultaneously both in the direction of low pressures and in the direction of high pressures, as has already been described in previous sections with respect to the first spring element for one direction.

In a further possible embodiment of the gas densimeter, the housing is a multipart housing, wherein at least the first housing chamber is disposed in a first housing part and at least one further housing chamber is disposed in a second housing part. The first and second housing parts are connected indirectly or directly to one another and/or can be rotated relative to one another about at least one axis of rotation. This has the advantage that the gas densimeter can be modularly constructed and can be manufactured cost-effectively. In combination with a display device or a contact device, which is disposed on or in the second housing part, the rotatability results in the advantage that the orientation of the display device or the accessibility of the contact device can be adapted to different installation situations of the gas densimeter and thus optimized.

In a further possible embodiment of the gas densimeter, it is provided that at least the second housing chamber is disposed in the second housing part. It can be provided further that the housing parts have a detachable or non-detachable indirect or direct connection with one another, for example, a welded connection, a screwed connection, a plug connection, a snap connection, a connection with a bayonet lock, or a clamping connection. Such a use of two housing parts and a division of the housing chambers into these result in the advantage that components of the gas densimeter can be manufactured more easily and more cost-effectively and the gas densimeter is modularly constructed and thus, for example, individual components can be easily replaced in the case of failure.

In a further possible embodiment of the gas densimeter, it is provided that the at least one axis of rotation is disposed parallel and/or congruently to the longitudinal axes and/or axes of symmetry of the body of the housing parts. It can be provided further that the housing comprises at least two housing parts and a housing coupling part, wherein the two housing parts are connected to the housing coupling part at two different surfaces thereof and are each rotatable about different axes of rotation, predetermined by the orientation of the respective surface of the housing coupling part. As a result, the gas densimeter can be particularly flexibly adapted to specific installation situations and easily oriented.

In a further possible embodiment of the gas densimeter, it is provided that the first housing part and the second housing part have a substantially cylindrical shape and an axis of symmetry A of the first housing part extends at least substantially parallel and/or at least substantially congruently to an axis of symmetry B of the second housing part. As a result, a modular and compact design of the gas densimeter can be achieved that is particularly easy to fabricate and can be produced at low cost.

In this context, the axes of symmetry relate to the symmetry of the cylindrical base body of the housing parts. Possible breaks in symmetry due to molded-on or added parts, such as a coupling or an electrical contact device, or abrasions on the surface of the body need not be considered here.

In a further possible embodiment of the gas densimeter, the constant amount of reference gas in the reference chamber is adjusted such that when the gas densimeter is subjected to a first pressure, which can be associated with a normal operating state of the gas chamber, a second pressure that is lower than the limit pressure is established in the reference chamber in the equilibrium of all acting compressive forces, mechanical stresses, and/or spring forces. The limit pressure is lower than the first pressure. In particular, the second pressure can then be at least 0.1 bar, 0.15 bar, or 0.2 bar lower than the limit pressure. The advantage mentioned in relation to a previous refinement of the gas densimeter that a defect in the gas densimeter, which leads to a gas-permeable connection between the reference chamber and the first housing chamber, can be detected more easily, is further improved by this embodiment. It is ensured by this embodiment that the increase in pressure, caused by the defect, in the reference chamber leads to an effect on the transmitting and/or monitoring unit, which is equivalent to a drop in the applied pressure to below the limit pressure.

In a further possible embodiment of the gas densimeter, the transmitting and/or monitoring unit comprises a display device with a pointer element and a pointer detection device which is set up to detect the position or location of the pointer and to convert it into an electrical signal and either a signal contact device which is electrically connected to the pointer detection device and is accessible from outside the housing, or a radio device which is electrically connected to the pointer detection device and converts the electrical signal of the pointer detection device into a radio signal. This results in the advantage that the gas density measurement can be done not only by reading a display device or receiving a threshold signal, but also an evaluation of the gas density measurement can be carried out continuously via an electrical connection to the signal contact device or via a radio link.

In a further possible embodiment of the gas densimeter, the pointer detection device comprises one or more Hall sensors and an electronic evaluation device, wherein the pointer is connected directly or indirectly to a magnet. A movement of the pointer leads to a movement of the magnet and thus to a change in the magnetic field, which is detected by means of the pointer detection device and converted into an electrical, in particular analog or digital signal.

In a further possible embodiment of the gas densimeter, the electrical signal is an analog current signal, e.g., a 4 mA to 20 mA signal, or a voltage signal, e.g., a 0 to 10 V signal, or a digital signal, in particular according to a customary industry standard.

In a further possible embodiment of the gas densimeter, it is provided that the radio module generates a radio signal according to a customary radio standard and/or comprises a power supply device and/or an antenna module. The antenna module can be disposed in the housing or mounted on the edge of a housing surface section. A power supply device can in particular comprise a battery. This can be disposed accessible from the outside and replaceable in a battery compartment on the housing. As a result, complex cabling can be dispensed with and remote access can be facilitated.

Due to the use of a battery, the gas densimeter can operate largely autonomously and be easily maintained by a user.

In a further possible embodiment of the gas densimeter, the coupling comprises a process connection for connecting the coupling to the gas chamber, a measuring connection via which the coupling is connected to the gas densimeter, a shut-off device, an access connection, and a line system, which connects the access, process, and measuring connection and the shut-off device to one another in a gas-permeable manner. The shut-off device is disposed in the line system such that the connection between the process connection and the measuring connection and the connection between the process connection and the access connection can be shut off by the shut-off device, wherein the measuring connection and the access connection are permanently connected to one another in a gas-permeable manner. This results in the advantage that the gas-permeable connection of the gas densimeter to the gas chamber can be shut off first with the help of the shut-off device and the gas densimeter can then be acted upon via the access connection, for example, by a test gas or test pressure and its function can be checked thereby. The gas densimeter need not be removed from the gas chamber in order to be tested in this way.

In a further possible embodiment of the gas densimeter, the process connection is designed as a connection for the installation of the gas densimeter on a gas chamber. Such a connection can be realized, for example, by an internal or external thread, by a flange connection, or by a plug-in coupling. The measuring connection can be designed to have a gas-permeable connection with the first housing chamber of the gas densimeter and, in particular, to have a direct or indirect connection with the gas densimeter. This connection can be, for example, a welded connection, a soldered connection, a clamping connection, a snap-in connection, an adhesive connection, or a screwed connection. The access connection can be designed as an internal or external thread, as a flange connection, plug-in connection, or coupling with a union nut. The access connection can be provided further with a self-sealing valve so that the connection to the line system is shut off when the connection to a mating coupling that opens the self-sealing valve is released.

In a further possible embodiment of the gas densimeter, it is provided that the coupling is designed as a one-piece part and the line system is formed in the coupling. A one-piece design of the coupling results in a particularly high tightness and high robustness against vibrations and mechanical shock. The coupling and parts of the coupling can be formed of metallic materials such as, for instance, aluminum, copper, brass, steel, or stainless steel.

In a further possible embodiment of the gas densimeter, it is provided that the shut-off device can be or must be opened and closed with a tool, in particular a key, wherein the shut-off device comprises a valve having a sealing body which has a conical shape. The valve can also be designed in the form of a ball valve. The requirement of using a tool to operate the valve prevents unauthorized persons from easily operating the valve.

In a further possible embodiment of the gas densimeter, it is provided that the first housing chamber comprises at least the reference bellows or the reference chamber, the measuring chamber, the separator, and partially the transmission element and the second housing chamber comprises the transmitting and/or monitoring unit.

In a further possible embodiment of the gas densimeter, it is provided that the first housing chamber additionally comprises the first spring element, the second spring element, and/or the separating bellows and the second housing chamber additionally comprises the at least one switching element. It is also possible, however, that at least one of the spring elements is disposed within the second housing chamber and there indirectly or directly exerts a force on the transmission element. In particular, a spring element can be disposed in the second housing chamber substantially parallel to the longitudinal axis of the reference bellows.

The two preceding embodiments result in the advantage that the gas densimeter is particularly easy to manufacture, is inexpensive to produce, and has a compact design.

In a further possible embodiment of the second aspect of the invention, it is provided that one or more access openings are provided to the reference chamber, said openings to which monitoring displays or monitoring sensors are either connected from outside the housing or monitoring sensors disposed inside the housing, in particular within the measuring chamber, are connected via lines to the reference chamber. Monitoring displays can be, for example, mechanical pressure gauges, in particular miniature pressure gauges. In particular, monitoring sensors can be electronic measuring transducers. Lines can be in particular flexible lines, hoses, or flexible capillary lines. Such monitoring displays or monitoring sensors can advantageously be used to monitor the pressure and/or gas density in the reference chamber and thereby make the tightness of the reference chamber verifiable. Electronic monitoring sensors can be connected via electrical lines to monitoring contact devices, via which the electrical measuring signals of the monitoring sensors can be picked up from outside the housing.

Electrical lines that in any embodiment or refinement of the gas densimeter are to be fed out from one housing chamber to another housing chamber or from the housing, for example, can be fed through plated-through holes, which are gas-impermeable. Such plated-through holes can in particular be glazed plated-through holes.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
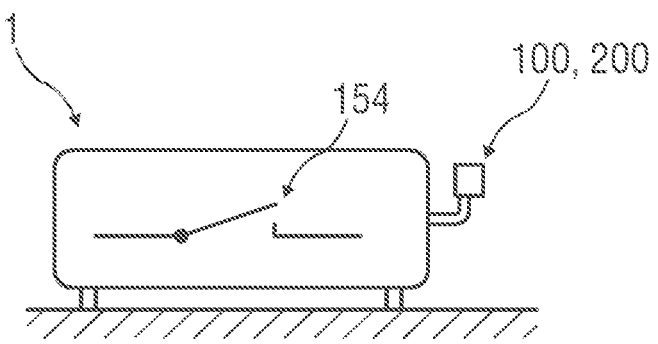
FIG. 1 shows schematically a sectional view of a gas chamber on which a gas densimeter is installed.

FIG. 1 shows a sectional view of a gas chamber 1 on which a gas densimeter 100, 200 is installed.

Gas chamber 1 houses, for example, an electrical circuit breaker 154 and is filled with an insulating gas, for example, sulfur hexafluoride (abbreviated as $SF_6$), which is provided for quenching electric arcs arising between contacts of circuit breaker 154.

Gas chamber 1 filled with the insulating gas is characterized by a defined pressure value, which can be associated with a normal operating state of gas chamber 1. In order to detect possible leakage or emission of the insulating gas at an early stage, a density of the insulating gas in gas chamber 1 is monitored by means of gas densimeter 100, 200, which is designed, for example, as a gas density monitor, and a corresponding limit value signal is triggered if the density falls below a defined limit value, which is lower than a predetermined nominal pressure.

Figure 2A:
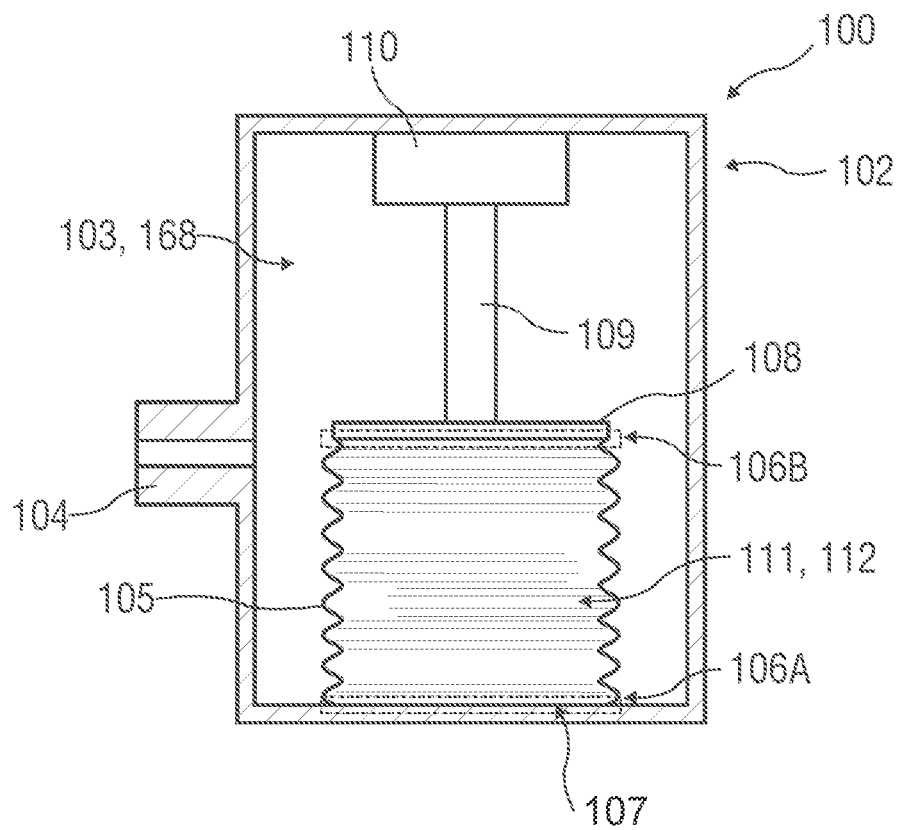
FIGS. 2A and 2B show schematically sectional views of various embodiments of a gas densimeter.

FIG. 2A shows a sectional view of a possible exemplary embodiment of a gas densimeter 100 having a housing 102, a first housing chamber 103, a coupling 104, a first bellows 105, a separator 108, a transmission element 109, and a transmitting and/or monitoring unit 110. A first end section 106A of bellows 105 is connected to a first inner wall section 107 of first housing chamber 103. A second end section 106B of bellows 105 is connected to or forms separator 108. Bellows 105 forms a reference chamber 111 by means of these connections, which is filled with a reference gas 112.

The insulating gas is introduced from gas chamber 1 into measuring chamber 168 via coupling 104. Measuring chamber 168 is formed by first housing chamber 103.

The insulating gas in measuring chamber 168 exerts a compressive force on a surface of separator 108. Reference gas 112, which is enclosed in reference chamber 111, i.e., in bellows 105, in turn exerts a compressive force on the opposite surface of separator 108. The system strives toward a state in which there is an equilibrium of forces.

Whereas the compressive force on the one surface of separator 108 is determined directly by the pressure of the introduced insulating gas, the compressive force on the opposite side of separator 108 by reference gas 112 can change in that the volume of reference chamber 111 changes. In this case, bellows 105 compresses or expands under the action of the compressive forces on the surfaces of separator 108 until there is an equilibrium of forces.

The translational motion that separator 108 undergoes during the compression or extension of bellows 105 is mechanically transmitted by transmission element 109 to transmitting and/or monitoring unit 110.

If the pressure of the insulating gas from gas chamber 1 decreases, bellows 105 is stretched. Separator 108 thus moves, for example, "upwards." If, in contrast, the pressure of the insulating gas from gas chamber 1 increases, bellows 105 is compressed and separator 108 moves "downwards."

If the temperature of the insulating gas in gas chamber 1 changes, this always leads to an increase in pressure, because gas chamber 1 is usually a container, closed gas-tight, with a constant volume. Likewise, cooling of the insulating gas in gas chamber 1 leads to a pressure drop.

However, these pressure changes do not correspond to a change in the gas density, therefore, no gain or loss of gas, which should be monitored, however. These pressure changes caused by temperature changes must therefore be compensated.

This is realized by the enclosed reference gas 112 in reference chamber 111. This is in thermal contact with gas chamber 1 and the insulating gas via the wall of bellows 105 and the entire housing 102. When the temperature of both the insulating gas and reference gas 112 rises, i.e., in the thermal equilibrium between measuring chamber 168 and reference chamber 111, the pressure in reference chamber 111 increases just as sharply as the pressure in measuring chamber 168. As a result, temperature-induced pressure changes do not lead to a change in the compressive forces on the surfaces of separator 108 and separator 108 does not perform any translational motion.

The prerequisite for an accurate temperature compensation is that as the temperature changes, reference gas 112 experiences the same pressure increase as the insulating gas. Thus, in particular precisely the gas that is also present in gas chamber 1 is used as reference gas 112.

Figure 2B:
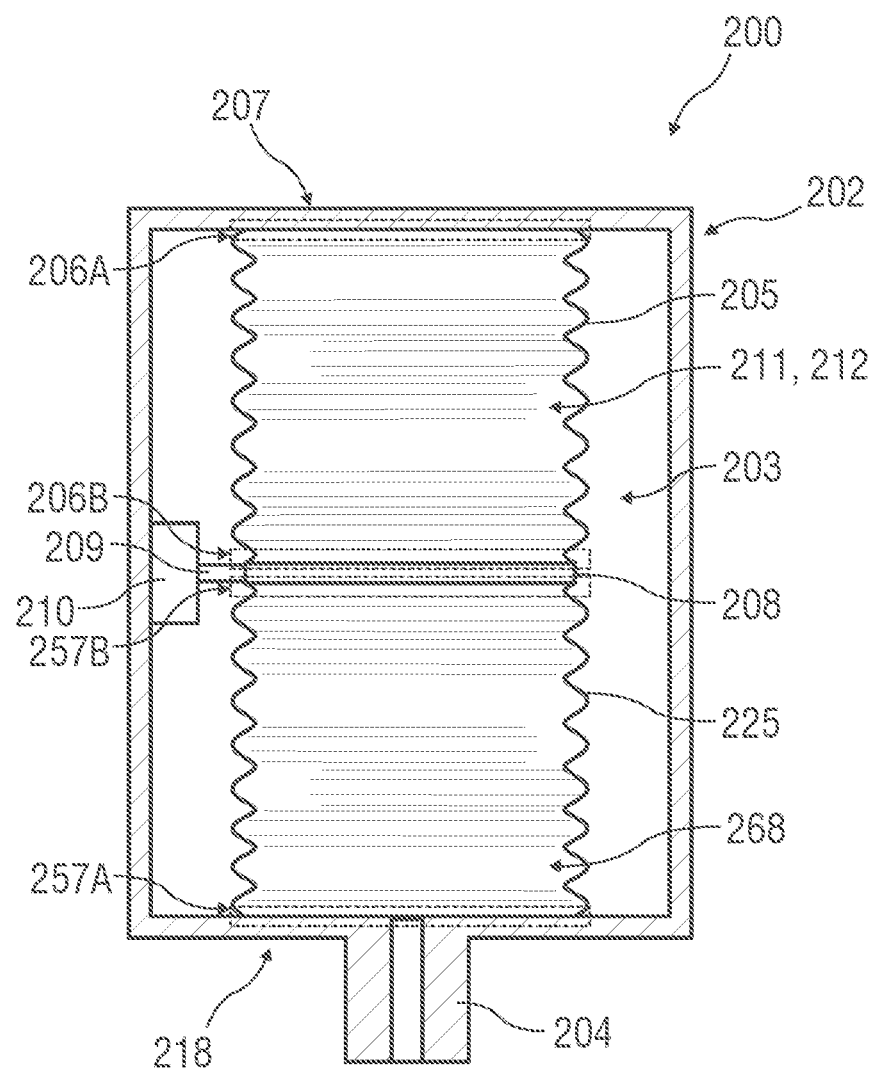

FIG. 2B shows a sectional view of a possible further exemplary embodiment of a gas densimeter 200 having a housing 202, a first housing chamber 203, a coupling 204, a first bellows 205, a second bellows 225, a separator 208, a transmission element 209, and a transmitting and/or monitoring unit 210.

A first end section 206A of bellows 205 is connected to an inner wall section 207 of first housing chamber 203. A second end section 206B of bellows 205 is connected to or forms separator 208. Bellows 205 forms a reference chamber 211 by means of these connections, which is filled with a reference gas 212.

A first end section 257A of bellows 225 is connected to an inner wall section 218 of first housing chamber 203 and coupling 204. A second end section 257B of bellows 225 is connected to or forms separator 208. Bellows 225 forms a measuring chamber 268 by these connections, which is filled with a gas which flows into measuring chamber 268 via the coupling.

In other words, measuring chamber 268 is not formed by first housing chamber 203 but by bellows 225. Thus, in contrast to the exemplary embodiment shown in FIG. 2A, the insulating gas flows from gas chamber 1 into bellows 225, which is disposed in housing chamber 203. The gas contained in bellows 225 presses from one side against separator 208, and reference gas 212 in reference chamber 211 presses from the other side against separator 208, so that an equilibrium of forces is established in the case of non-failure.

Figure 3A:
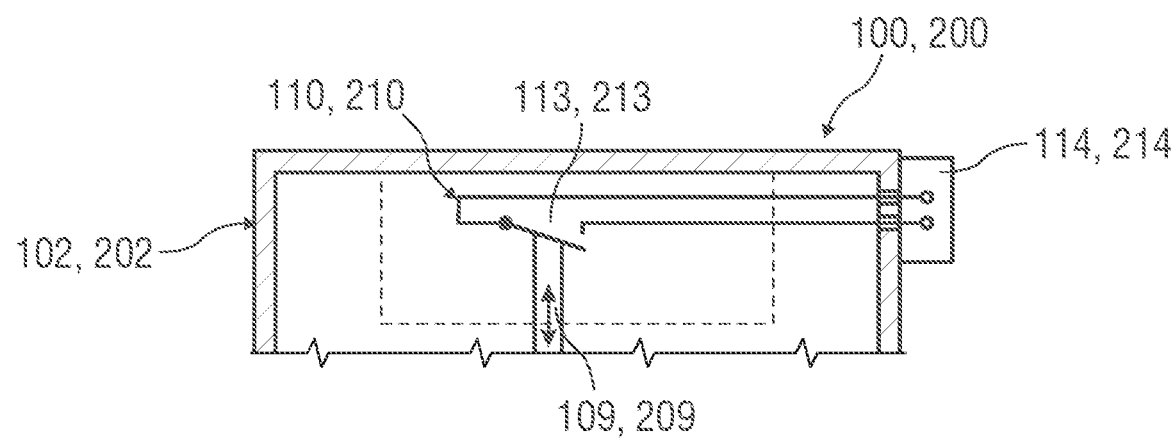
FIGS. 3A and 3B show schematically sectional views of a detail of various embodiments of a gas densimeter in the region of a transmitting and/or monitoring unit.
Figure 3B:
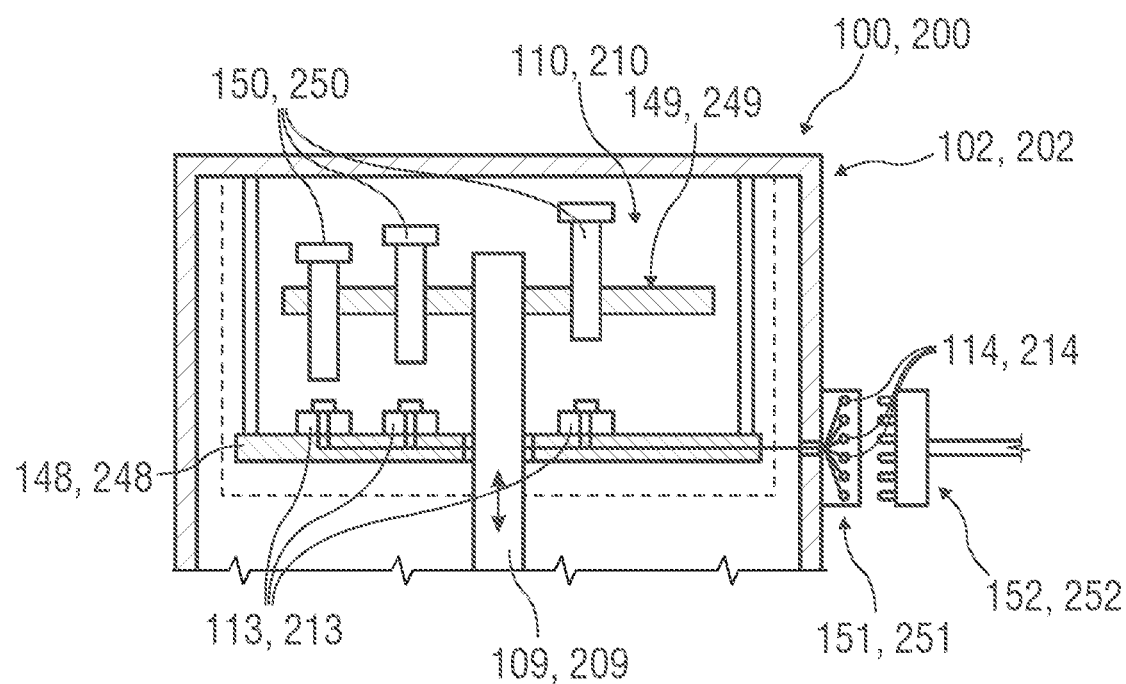

FIGS. 3A and 3B each show a sectional view of a detail of a possible exemplary embodiment of a gas densimeter 100, 200, wherein a structure and function of gas densimeter 100, 200 can correspond to the structure shown in FIGS. 2A, 2B and the functions described in FIGS. 2A, 2B.

A transmitting and/or monitoring unit 110, 210, coupled to a transmission element 109, 209, comprises a switching element 113, 213 and a contact device 114, 214.

In the exemplary embodiment shown in FIG. 3A, transmitting and/or monitoring unit 110, 210 is designed such that, if the pressure of the insulating gas in housing chamber 1 and thus in measuring chamber 168, 268 decreases, transmission element 109, 209 moves upwards and if the pressure falls below a predetermined switching pressure, it acts on switching element 113, 213, so that it closes and an electrical signal is applied at contact device 114, 214. However, if the pressure of the insulating gas within housing chamber 1 and thus in measuring chamber 168, 268 is sufficiently high and the pressure does not fall below the switching pressure, switching element 113, 213 is in an open state and no electrical signal is present at contact device 114, 214.

In the exemplary embodiment shown in FIG. 3B, multiple switching elements 113, 213 are additionally disposed on a carrier element 148, 248. Transmission element 109, 209 comprises an actuating element 149, 249 with multiple contact units 150, 250, which are each associated with switching elements 113, 213.

In the illustrated exemplary embodiment, transmitting and/or monitoring unit 110, 210 is designed such that at a sufficient pressure of the insulating gas in housing chamber 1 and thus in measuring chamber 168, 268, transmission element 109, 209 with actuating element 149, 249 is in a low position and actuates contact units 150, 250, thus closing switching elements 113, 213 continuously.

With a decreasing pressure of the insulating gas in housing chamber 1 and thus in measuring chamber 168, 268, transmission element 109, 209 with actuating element 149, 249 and contact units 150, 250 moves upwards, and switching elements 113, 213 are opened when the pressure falls below a predetermined and associated switching pressure.

Contact devices 114, 214 of switching elements 113, 213 are combined into a plug assembly 151, 251 and accessible from outside housing 102 and can be coupled to an external plug 152, 252.

Plug 152, 252, for example, is part of an external monitoring and/or display unit (not shown in more detail), by means of which the switching state of the individual switching elements 113, 213 can be picked up or determined electrically via plug 152, 252 and if the pressure falls below a certain value within gas chamber 1 and thus within measuring chamber 168, 268, corresponding information is output and/or appropriate measures are taken, for example, forwarding of information to a control center or maintenance personnel and/or operating personnel.

Figure 3C:
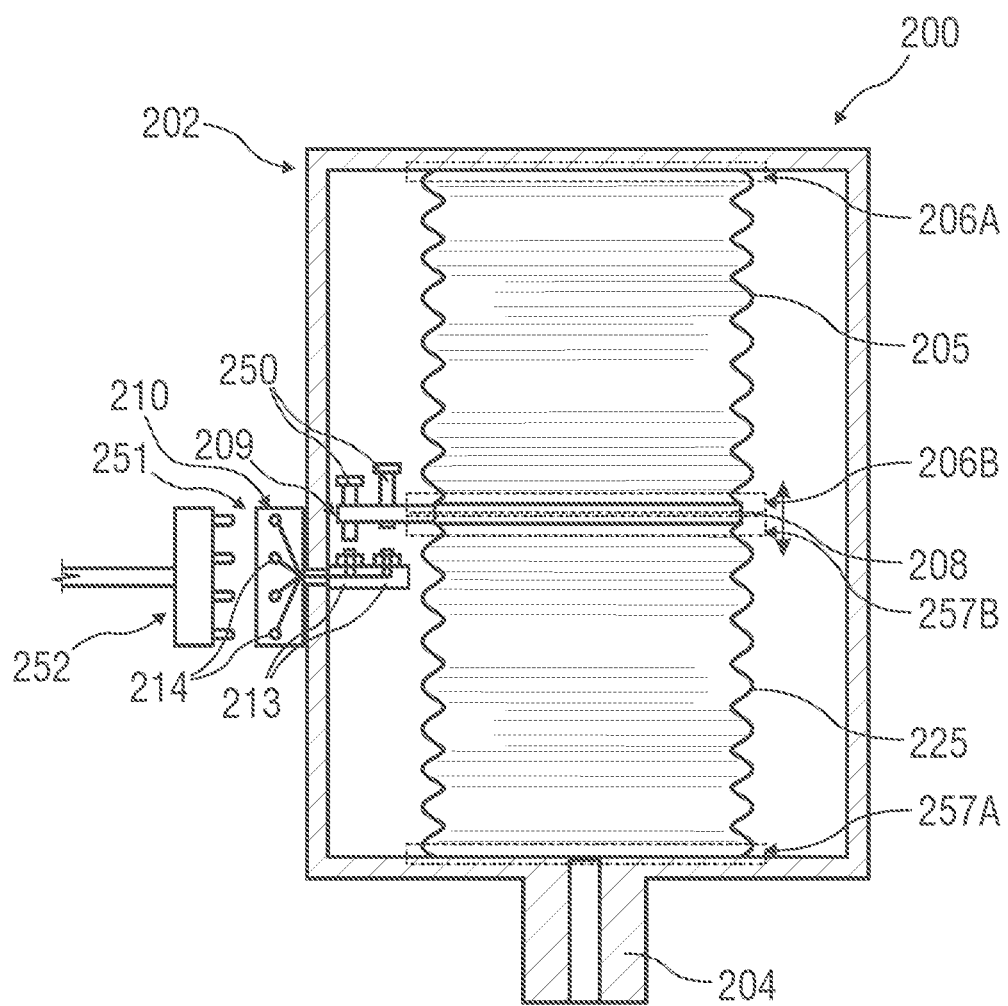
FIGS. 3C and 3D show schematically sectional views of various embodiments of a gas densimeter with a transmitting and/or monitoring unit.
Figure 3D:
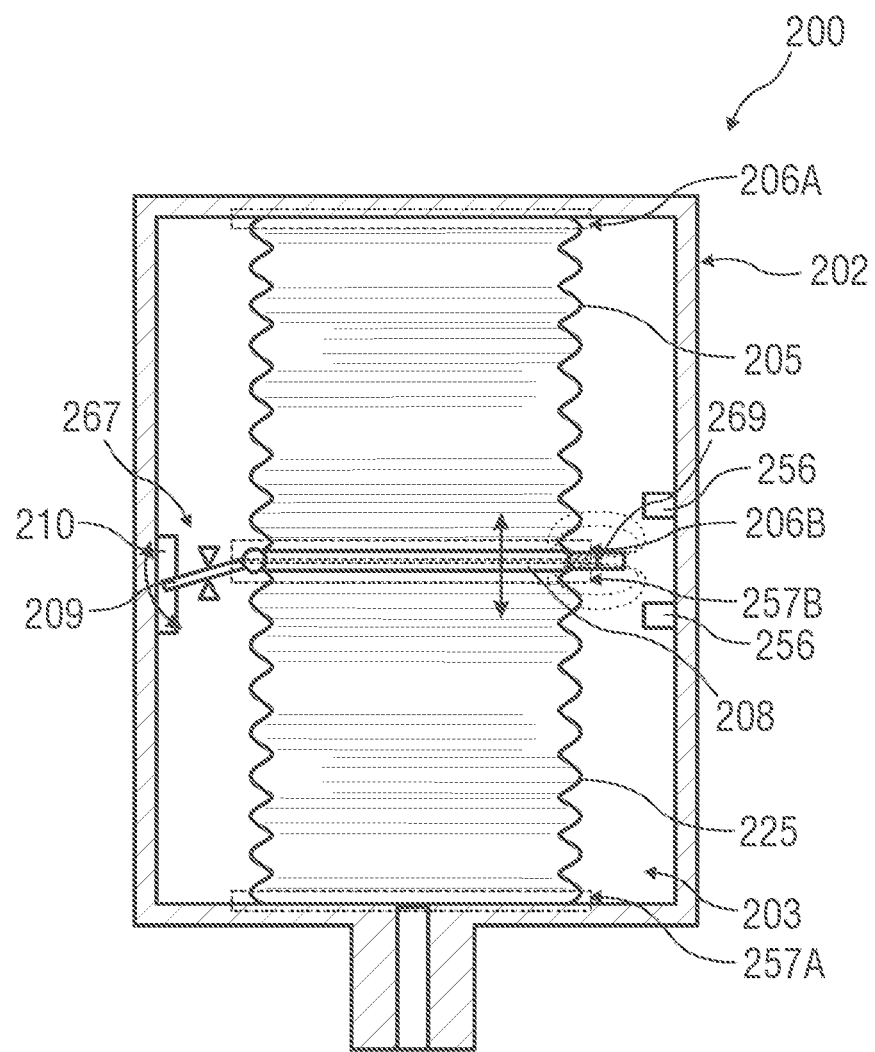

FIGS. 3C and 3D show sectional views of various exemplary embodiments of a gas densimeter 200 having a transmitting and/or monitoring unit 210, wherein a structure and function of gas densimeter 200 correspond in particular to the structure shown in FIG. 2B and the function described in FIG. 2B.

In the exemplary embodiment shown in FIG. 3C, transmitting and/or monitoring unit 210 is designed according to the description of FIG. 3B.

In the exemplary embodiment illustrated in FIG. 3D, transmitting and/or monitoring unit 210 comprises a magnetic element 269, fastened to separator 208 disposed between bellows 205, 225, and two magnetic field sensors 256. Separator 208 is fastened to housing 202 on a side opposite magnetic element 269 with a pivotable suspension point 267, so that a displacement of separator 208 occurs at different pressure conditions within bellows 205, 225 and thus a relative position of magnetic element 269 relative to magnetic field sensors 256 changes. As a result, different states, in particular different positions of separator 208 and the resulting different pressure or density values, which must be present in measuring chamber 268, can be detected and output by means of transmitting and/or monitoring unit 210.

Figure 4A:
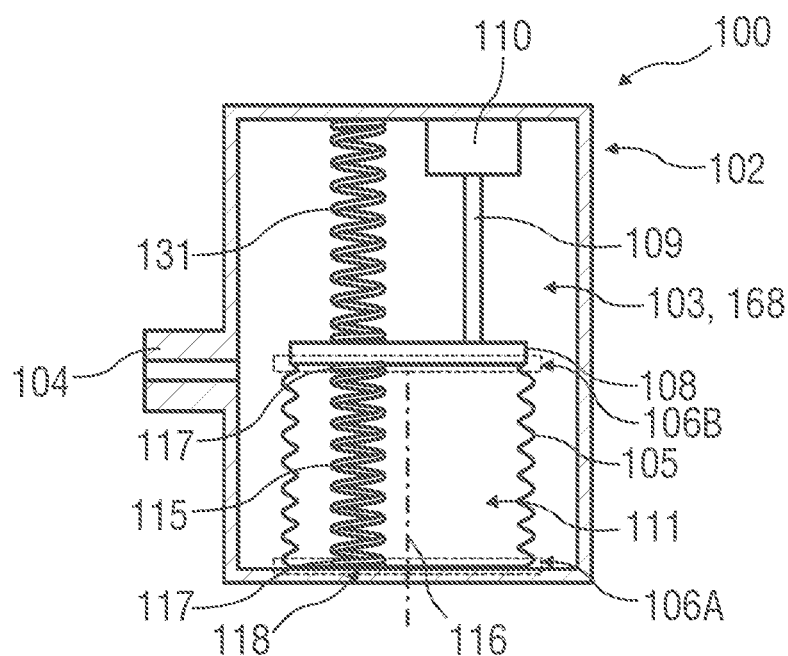
FIGS. 4A to 4E show schematically sectional views of various embodiments of a gas densimeter with two spring elements.
Figure 4B:
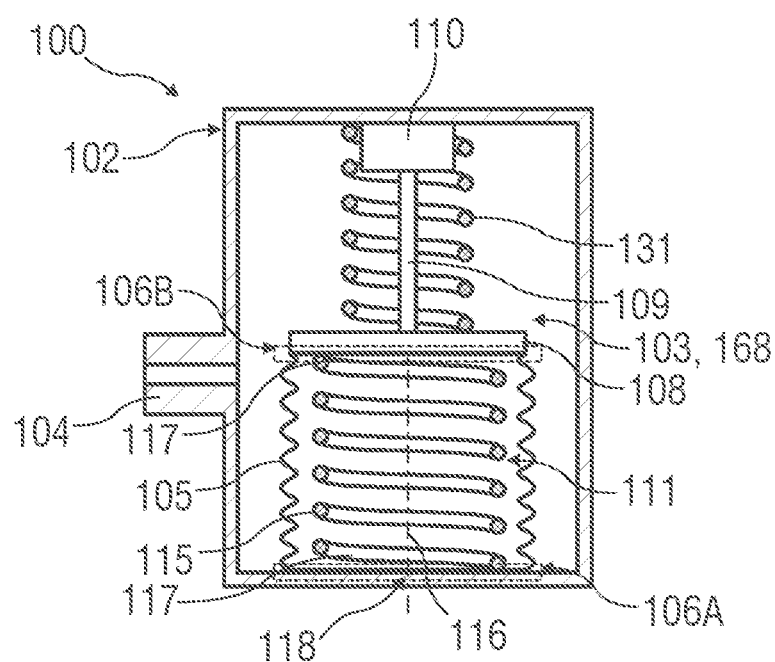
Figure 4C:
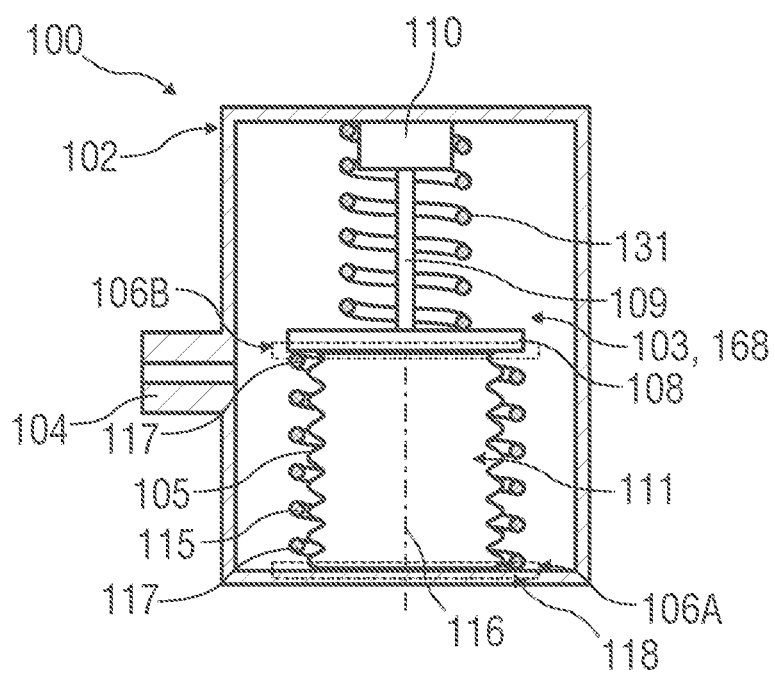

FIGS. 4A, 4B, and 4C show sectional views of various embodiments of a gas densimeter 100 having a housing 102, a first housing chamber 103, a coupling 104, a first bellows 105, a separator 108, a transmission element 109, a transmitting and/or monitoring unit 110, and a first spring element 115. End sections 117 of first spring element 115 are connected to separator 108 and to a second inner wall section 118. A longitudinal axis 116 or central axis of first bellows 105 is also drawn in. First spring element 115 in the illustrated exemplary embodiments is oriented at least substantially parallel to this longitudinal axis 116 and/or surrounds longitudinal axis 116 coaxially. Furthermore, a second spring element 131 is provided whose spring force counteracts a spring force of first spring element 115.

It is achieved by means of spring elements 115, 131 that, in addition to the compressive forces of the gases, spring forces act on one or both surfaces of the separator. These are linearly dependent on the compression of the respective spring element 115, 131. The translation, necessary for an equilibrium of forces, of separator 108 and the associated change in the volume of reference chamber 111 can be reduced in that a spring element 115, 131 is increasingly compressed and thereby exerts an ever-greater spring force on separator 108.

If, for example, spring element 115, 131 is disposed such that it presses from "above" on separator 108, it is increasingly compressed when the pressure drops in measuring chamber 168 located above. The compressive force of reference gas 112 thus not only presses against a falling compressive force of the insulating gas, but also against an increasing spring force. The particular spring element 115, 131 is dimensioned so that an equilibrium of forces is still possible with an unchanged maximum extension of the corresponding bellows 105, 125 and a defined lowest insulating gas pressure.

In FIG. 4A, second spring element 131 is disposed within first housing chamber 103 on the side of separator 108 opposite first bellows 105. First spring element 115 is disposed within first bellows 105.

In FIG. 4B, first spring element 115 is disposed within reference chamber 111 and coaxially surrounds longitudinal axis 116 of first bellows 105. Second spring element 131 is within first housing chamber 103 on the side of separator 108 opposite to first bellows 105 and coaxially surrounds transmission element 109. The function of spring elements 115, 131 corresponds to the function of spring elements 115, 131 shown in FIG. 4A.

In FIG. 4C, first spring element 115 is disposed within first housing chamber 103 and coaxially surrounding first bellows 105. The arrangement of second spring element 131 corresponds to the arrangement of the same as shown in FIG. 4B. The function of spring elements 115, 131 corresponds to the function of spring elements 115, 131 shown in FIG. 4A.

Figure 4D:
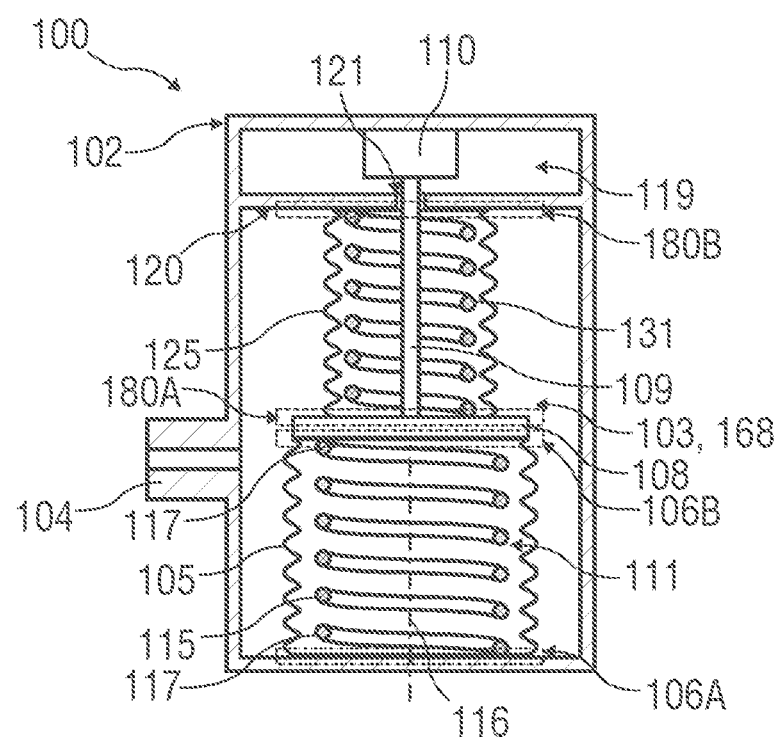

The exemplary embodiment of gas densimeter 100 shown in FIG. 4D comprises a first bellows 105 forming a reference chamber 111 and a second bellows 125, which are disposed together within first housing chamber 103 and fastened to separator 108. First housing chamber 103 thereby forms a measuring chamber 168.

Transmitting and/or monitoring unit 110 is disposed in a second housing chamber 119, wherein transmission element 109 is fed through a connection opening 121 of a partition wall 120 to transmitting and/or monitoring unit 110.

Both spring elements 115, 131 are each disposed coaxially to the respectively associated bellows 105, 125 within the same.

Figure 4E:
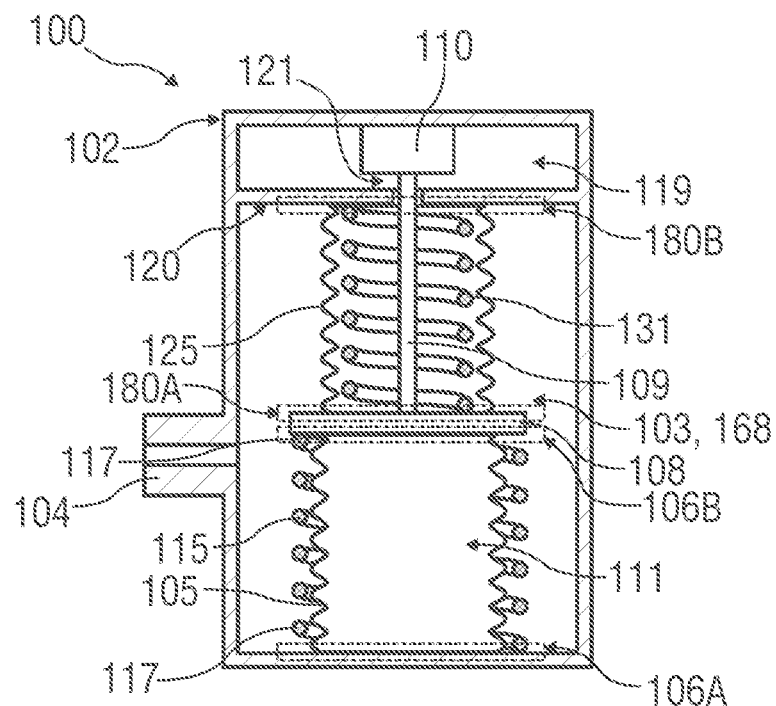

The exemplary embodiment of gas densimeter 100 shown in FIG. 4E also comprises a first bellows 105, forming a reference chamber 111, and a second bellows 125, which are disposed together within first housing chamber 103 and fastened to separator 108. First housing chamber 103 thereby forms measuring chamber 168.

In contrast to the exemplary embodiment shown in FIG. 4D, first spring element 115 is disposed within first housing chamber 103 and coaxially surrounding first bellows 105.

Figure 5A:
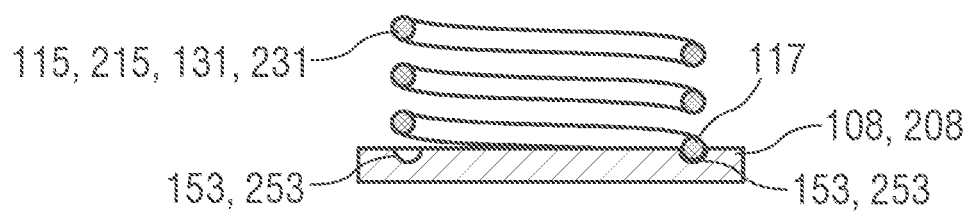
FIGS. 5A and 5B show schematically sectional views of various spring element receptacles.
Figure 5B:
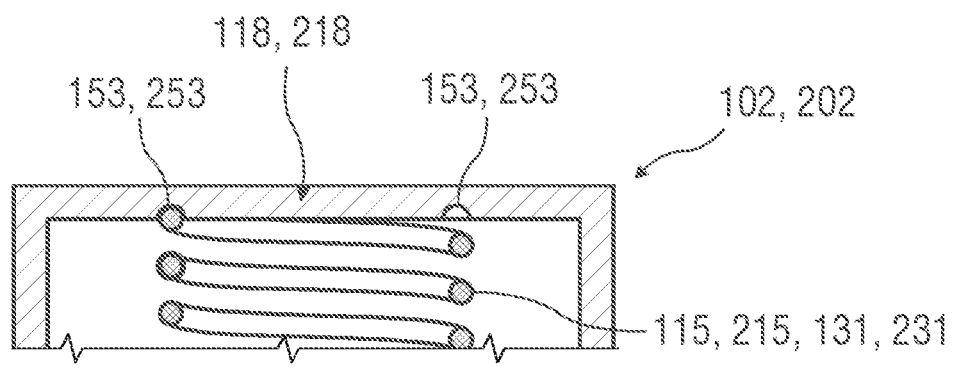

FIGS. 5A and 5B show, in two detailed sectional views, possible embodiments of spring element receptacles 153, 253 on separator 108, 208 and on second inner wall section 118, 218 for receiving first spring element 115, 215 and second spring element 131, 231. Spring element receptacles 153, 253 are in each case formed as a circumferential groove and at least for partially receiving a last turn of the respective spring element 115, 215, 131, 231.

Figure 6A:
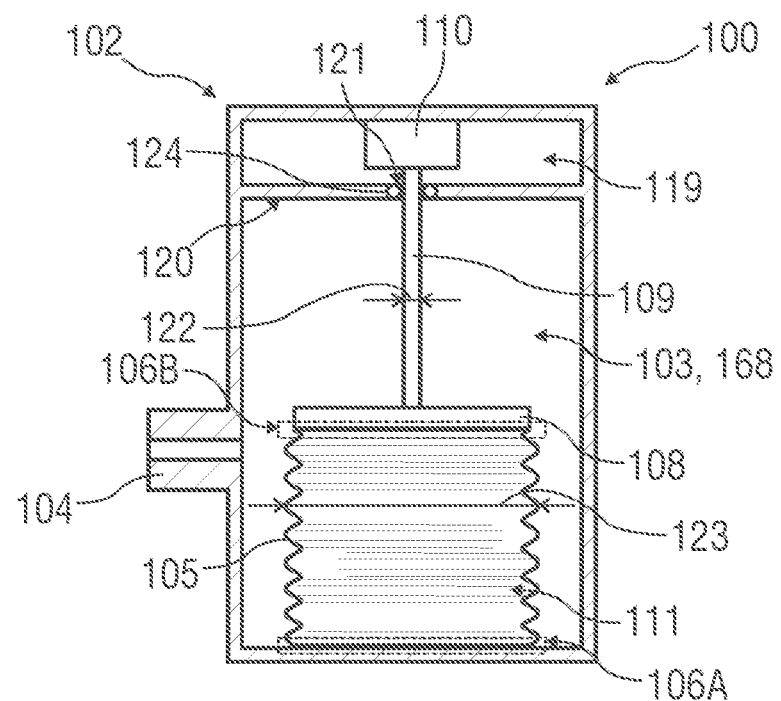
FIGS. 6A and 6B show schematically sectional views of various embodiments of a gas densimeter with two housing chambers.
Figure 6B:
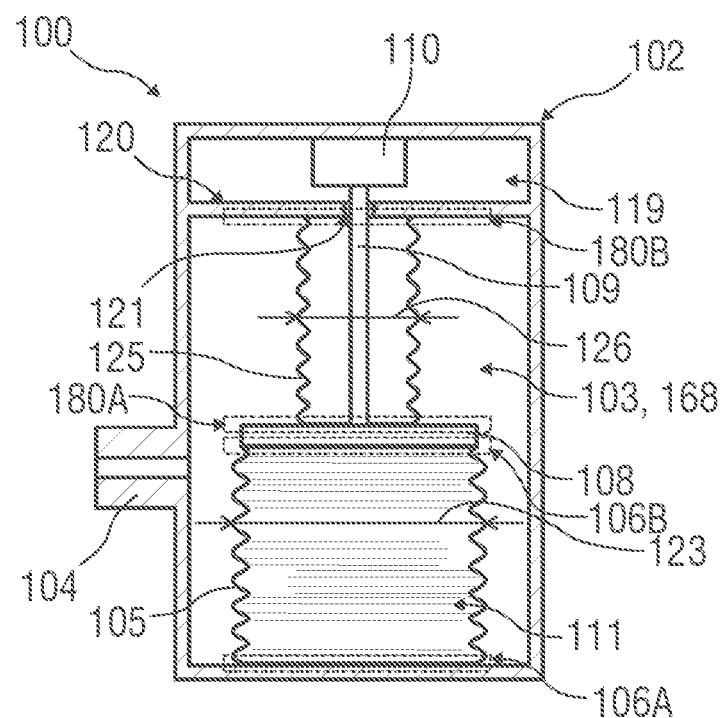

FIGS. 6A and 6B show sectional views of various embodiments of gas densimeters 100 having a housing 102, a first housing chamber 103, a coupling 104, a first bellows 105, a separator 108, a transmission element 109, a transmitting and/or monitoring unit 110, a second housing chamber 119, a partition wall 120, and a connection opening 121.

In this case, transmitting and/or monitoring unit 110 is disposed in second housing chamber 119, wherein transmission element 109 is fed through connection opening 121 of partition wall 120 to transmitting and/or monitoring unit 110.

In the exemplary embodiment shown in FIG. 6A, a sealing element 124 is additionally disposed in connection opening 121. A cross-sectional area 122 of transmission element 109 is formed smaller in this case than a cross-sectional area 123 of first bellows 105.

If, in contrast, the cross-sectional areas 122, 123 were of the same size, the gas in measuring chamber 168 would not have an effective surface on separator 108 against which it could exert a compressive force. However, if cross-sectional area 122 is smaller, there is such a surface and there is a lower pressure in reference chamber 111 than in measuring chamber 168 at the equilibrium of forces.

If transmission element 109, sealed with sealing element 124, is fed out of measuring chamber 168, this has the consequence that the insulating gas from gas chamber 1 in measuring chamber 168 can no longer press against the complete surface of separator 108. The resulting compressive force is therefore smaller than if it could be pressed against the entire surface. However, reference gas 112 within reference chamber 111 can push against the entire surface of separator 108, at least within the diameter of reference bellows 105. This means that at the equilibrium of forces a smaller pressure is established in reference chamber 111 than in measuring chamber 168.

This has the decisive advantage that a pressure increase in reference chamber 111 occurs in the failure case of a leak between measuring chamber 168 and reference chamber 111 and the consequent gradual pressure equalization between the chambers. However, this then leads to a translation of separator 108, which is equivalent to a pressure drop in measuring chamber 168 without faults.

In combination with the measuring range extension to low pressures with a spring element 115, 131, it is inevitable that from a certain point, the pressure of the insulating gas falls below the pressure in reference chamber 111. However, the amount of gas in reference chamber 111, the ratio of the free surfaces against which the insulating gas and reference gas 112 press, and the spring strength of spring element 115, 131 can then be advantageously adjusted so that the pressure in reference chamber 111 is at least lower than the pressure in measuring chamber 168 when the measuring chamber pressure corresponds to a normal operating pressure of the system.

In the exemplary embodiment shown in FIG. 6B, a second bellows 125 is provided, wherein a cross-sectional area 126 of second bellows 125 is smaller than cross-sectional area 123 of first bellows 105. Second bellows 125 in this case is connected with a first end section 180A to separator 108 and with a second end section 180B to partition wall 120 and seals second housing chamber 119 against first housing chamber 103.

Figure 7:
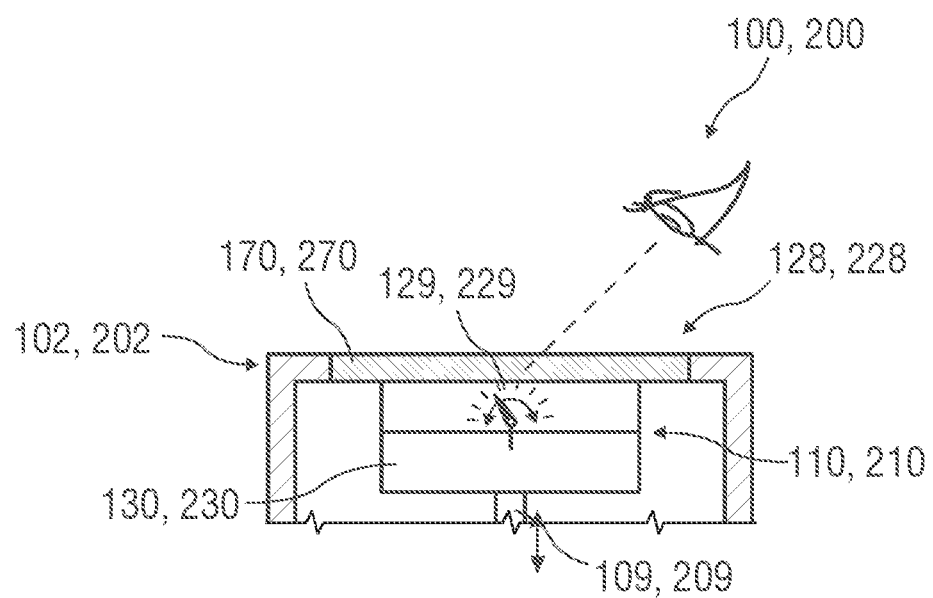
FIG. 7 shows schematically a sectional view of a detail of a gas densimeter with a display device.

FIG. 7 shows a sectional view of a detail of a gas densimeter 100, 200, which is designed according to a gas densimeter 100, 200 shown in FIGS. 2 to 6.

In addition, transmitting and/or monitoring unit 110 comprises a mechanism 130 and a display device 128 with a pointer element 129. Arrows indicate that an extension or compression of first bellows 105 leads to a change in the display, as a result of which a change in the pressure in gas chamber 1 can be displayed during fault-free operation.

Even in the case of a fault in which a leak between measuring chamber 168, 268 and reference chamber 111, 211 leads to a movement of separator 108, 208 as in a pressure drop in gas chamber 1, this is indicated accordingly. As a result, a fault can be detected. By comparison with other measuring points it can then be realized that in fact there is no pressure drop in gas chamber 1 and a fault in gas densimeter 100, 200 itself can be identified.

Figure 8A:
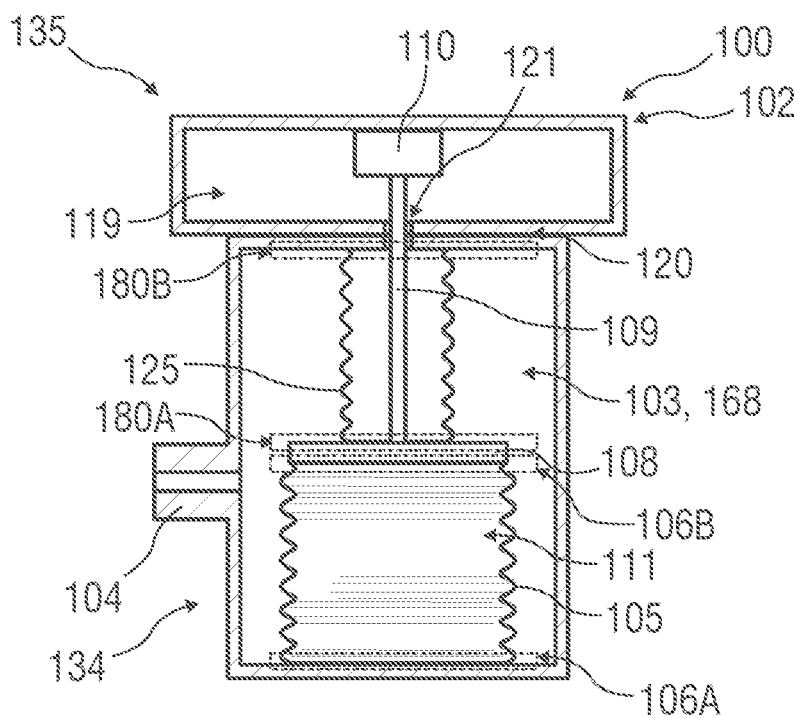
FIGS. 8A and 8B show schematically a sectional view and a side view of a gas densimeter with two housing parts.
Figure 8B:
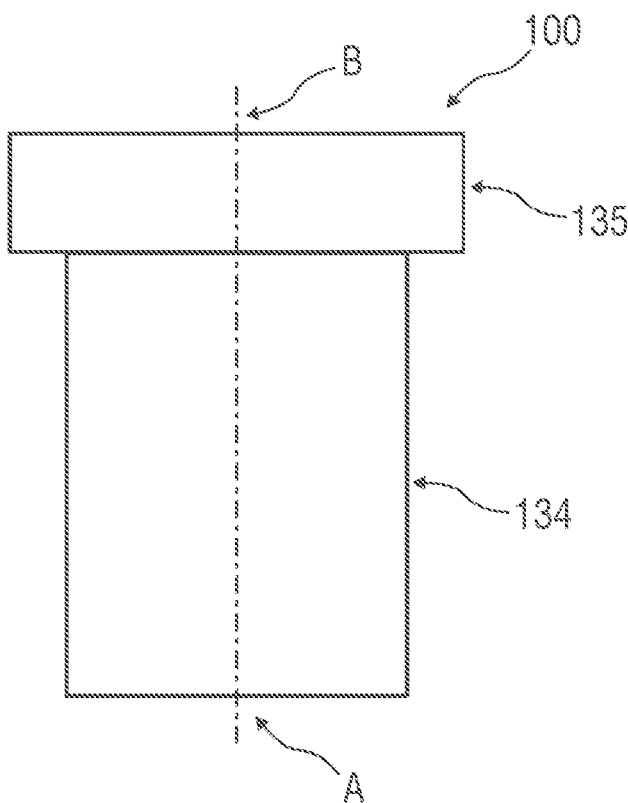

FIG. 8A shows a sectional view of a possible exemplary embodiment of a gas densimeter 100. FIG. 8B shows a side view of gas densimeter according to FIG. 8A.

In contrast to the exemplary embodiment shown in FIG. 6B, housing 102 comprises two housing parts 134, 135, wherein first housing chamber 103 is formed in a first housing part 134 and second housing chamber 119 in a second housing part 135. Partition wall 120 is designed as a double wall and in each case comprises a top wall of first housing part 134 and a bottom wall of second housing part 135, wherein connection opening 121 extends through both walls. Apart from that, gas densimeter 100 is formed according to the description for FIG. 6B.

First housing part 134 has a smaller diameter than second housing part 135, wherein axes of symmetry A, B of the two housing parts 134, 135 are congruent.

Figure 9A:
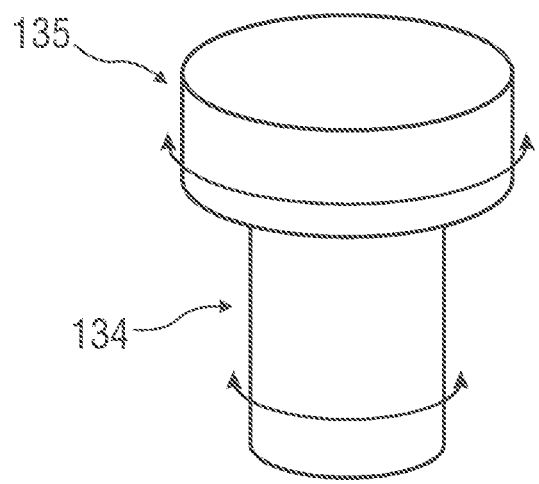
FIGS. 9A and 9B show schematically perspective views of a gas densimeter with two cylindrical housing parts.
Figure 9B:
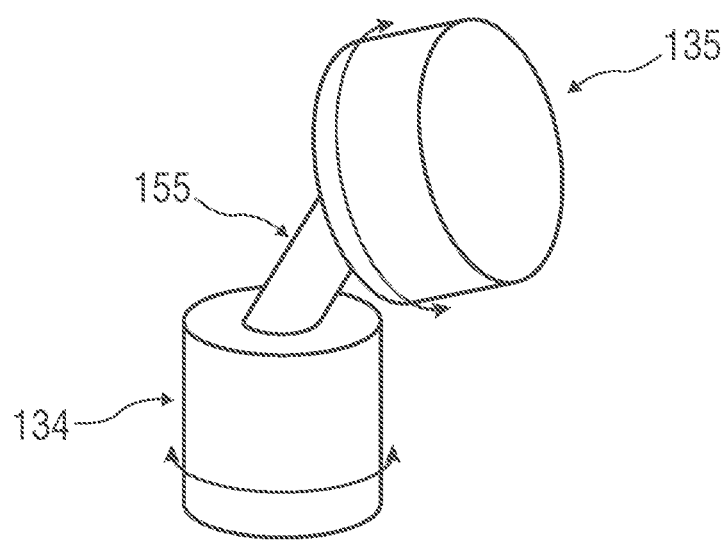

FIGS. 9A and 9B show perspective views of different exemplary embodiments of a gas densimeter 100 with two cylindrical housing parts 134, 135.

In this case, the axes of rotation of housing parts 134, 135 in the exemplary embodiment shown in FIG. 9A are congruent, but they are angled to one another in the exemplary embodiment shown in FIG. 9B.

Figure 10:
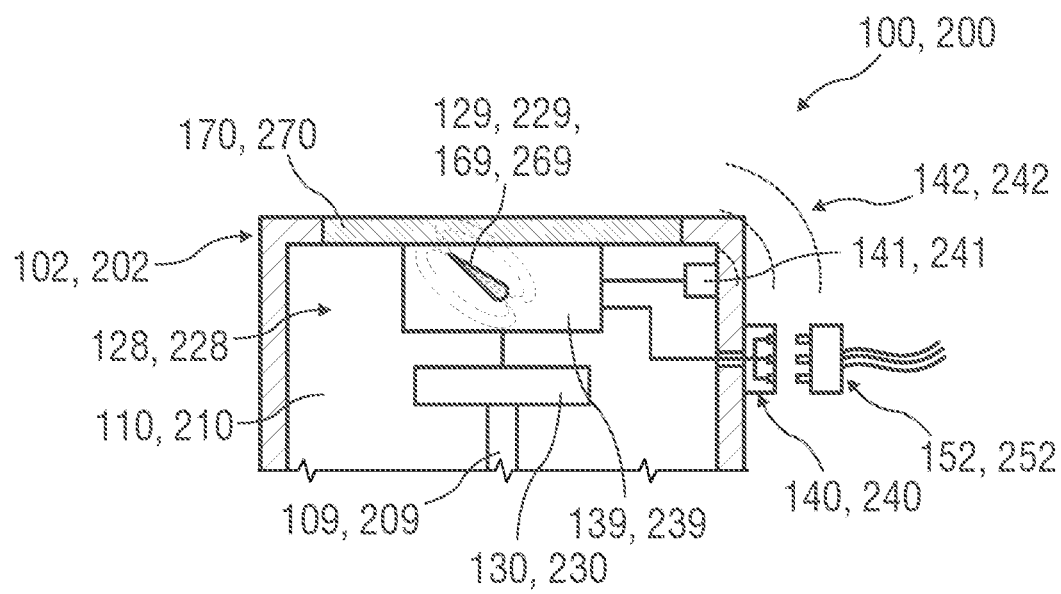
FIG. 10 shows schematically a sectional view of a detail of a gas densimeter with a pointer detection device.

FIG. 10 shows a sectional view of a portion of a possible exemplary embodiment of a gas densimeter 100, 200 with a housing 102, 202, a transmitting and/or monitoring unit 110, 210, a mechanism 130, 230, a display device 128, 228 with a pointer element 129, 229, and a pointer detection device 139, 239.

Pointer detection device 139, 239 determines a position of pointer element 129, 229, which is shown schematically as a magnetic element 169, 269, by means of magnetic field sensors, for example, Hall elements.

Pointer detection device 139, 239 is connected to a signal contact device 140, 240, which can be contacted with an external plug 152, 252. Plug 152, 252 is, for example, part of an external monitoring and/or display unit (not shown in more detail), by means of which information corresponding to the pointer position and thus describing a current gas density is output and/or appropriate measures are taken, for example, forwarding of information to a control center or maintenance personnel and/or operating personnel.

Alternatively or in addition, pointer detection device 139, 239 is connected to a radio device 141, 241 which emits a radio signal 142, 242, comprising the position of pointer element 129, 229.

The further structure and the further function of gas densimeter 100, 200 correspond to one of the exemplary embodiments shown and described in the previous figures.

Figure 11:
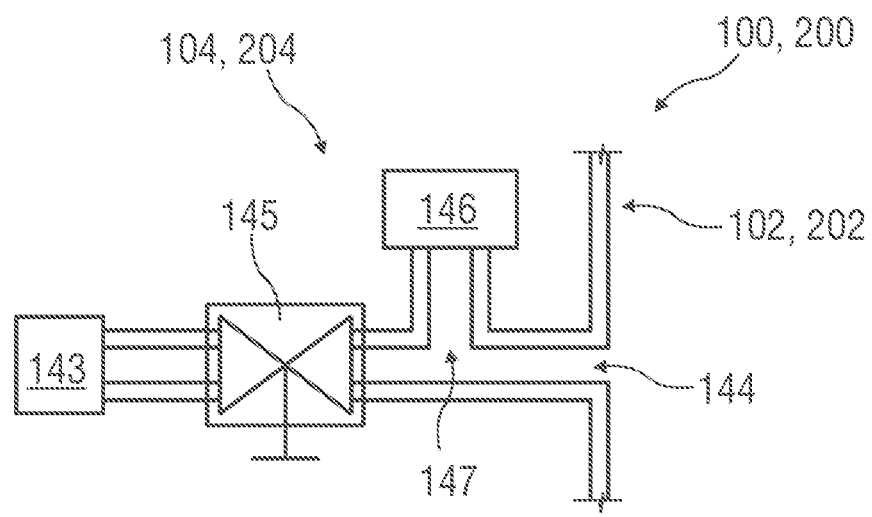
FIG. 11 shows schematically a schematic plan of a coupling of a gas densimeter.

FIG. 11 shows a schematic plan of a coupling 104, 204 of a gas densimeter 100, 200 with a process connection 143, a measuring connection 144, a shut-off device 145, an access connection 146, and a line system 147.

Coupling 104, 204 can be used to test gas densimeter 100, 200. For this purpose, shut-off device 145 is first closed, so that gas densimeter 100, 200 is no longer connected to gas chamber 1.

Thereafter, a testing device (not shown in more detail), which subjects gas densimeter 100, 200 to a test pressure, is connected to access connection 146.

If the test has ended, the testing device is disconnected again from access connection 146 and shut-off device 145 is opened. Gas densimeter 100, 200 again fulfills its measuring function.

FIGS. 12A to 12D show sectional views of various embodiments of a gas densimeter 200 with two spring elements 215, 231 and a second bellows 225 designed as a measuring bellows.

In all exemplary embodiments, gas densimeter 200 comprises a housing 202, a first housing chamber 203, a coupling 204, a first bellows 205, the second bellows 225 designed as a measuring bellows, a separator 208, a transmission element 209, a transmitting and/or monitoring unit 210, and a first spring element 215, wherein first spring element 215 is arranged in different positions in the different exemplary embodiments. Further, a second spring element 231 is provided, which is likewise arranged in different positions in the different exemplary embodiments.

Figure 12A:
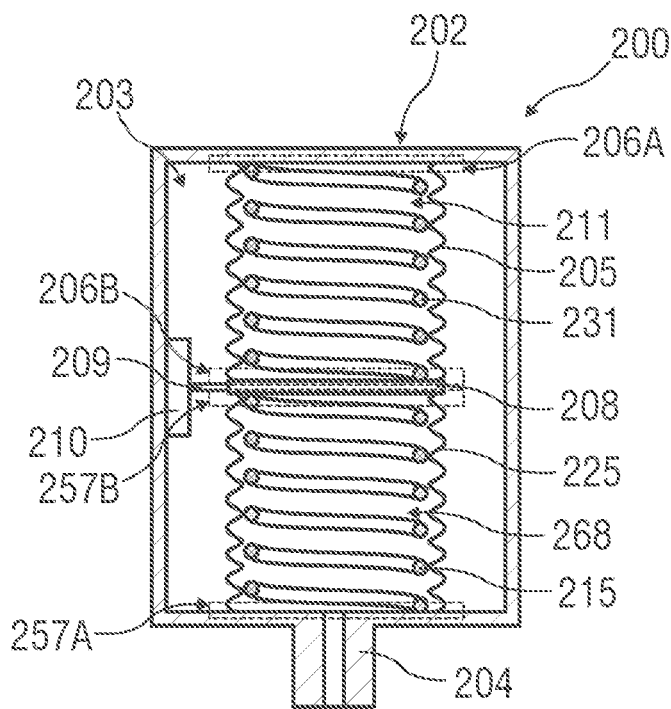
FIGS. 12A to 12D show schematically sectional views of various embodiments of a gas densimeter with two spring elements and a measuring bellows.

FIG. 12A shows an exemplary embodiment in which first spring element 215 is disposed within second bellows 225 coaxially therewith. Second spring element 231 is disposed within first bellows 205 coaxially therewith.

Figure 12B:
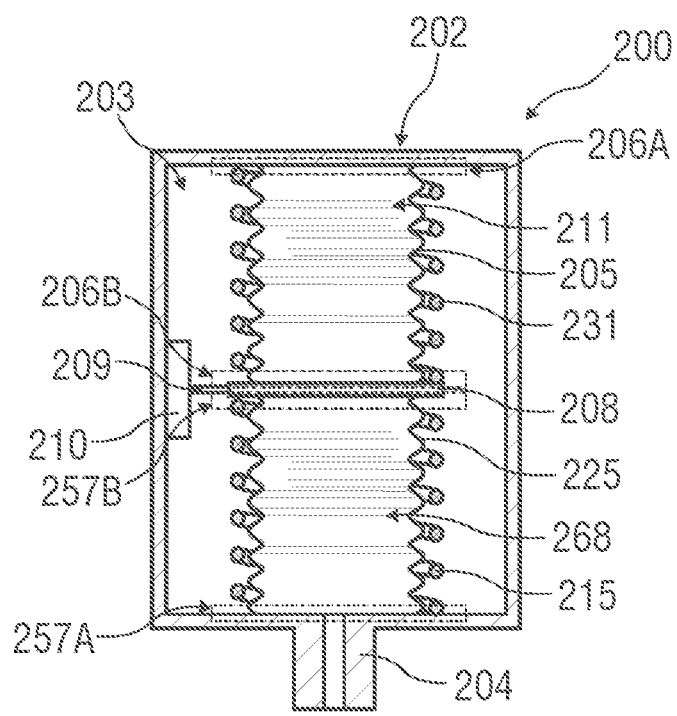

FIG. 12B shows an exemplary embodiment in which first spring element 215 is disposed outside second bellows 225 and coaxially surrounding it. Second spring element 231 is disposed outside first bellows 205 and coaxially surrounding it.

Figure 12C:
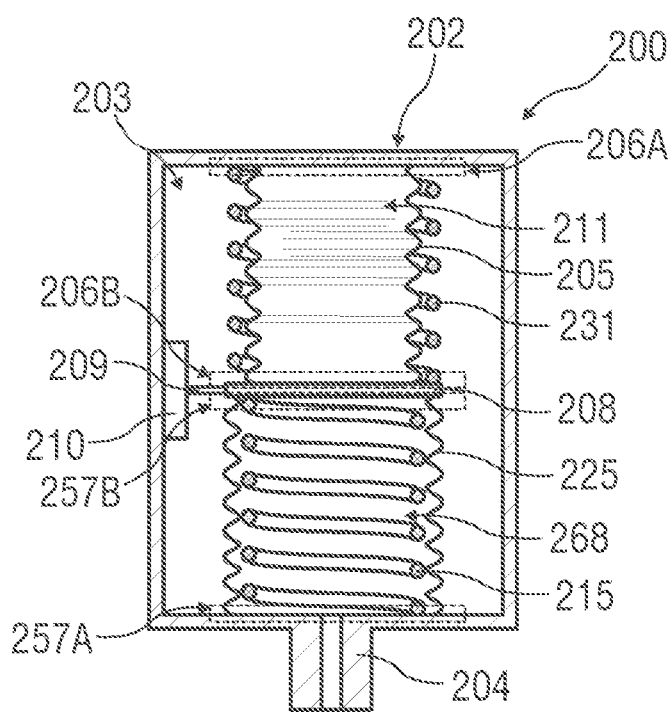

FIG. 12C shows an exemplary embodiment in which first spring element 215 is disposed within second bellows 225 coaxially therewith. Second spring element 231 is disposed outside first bellows 205 and coaxially surrounding it.

Figure 12D:
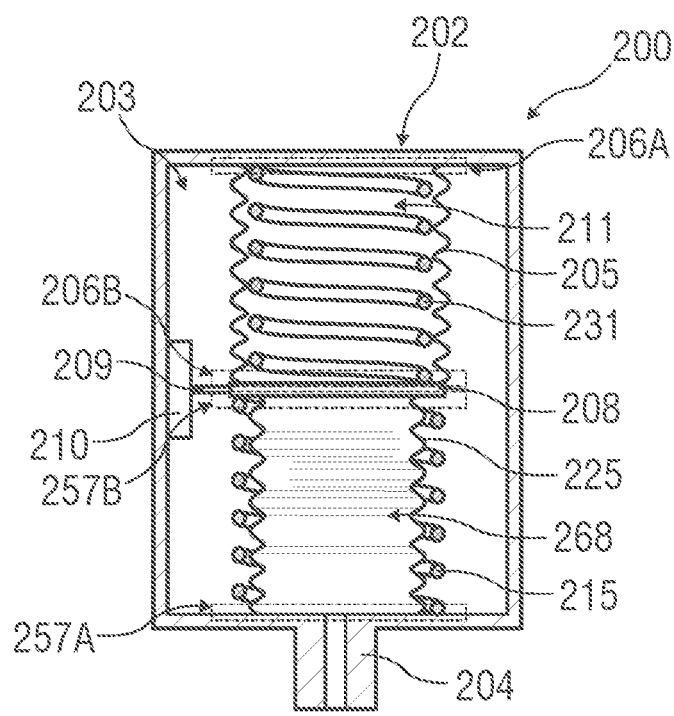

FIG. 12D shows an exemplary embodiment in which first spring element 215 is disposed outside second bellows 225 and coaxially surrounding it. Second spring element 231 is disposed within first bellows 205 coaxially therewith.

Figure 13A:
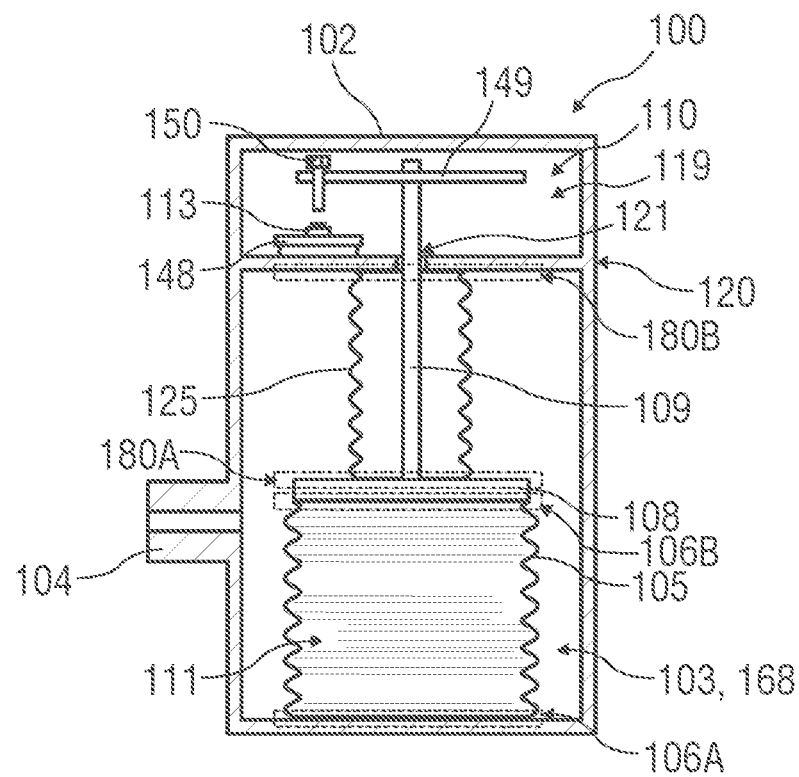
FIGS. 13A and 13B show schematically sectional views of a gas densimeter when subjected to different pressures.
Figure 13B:
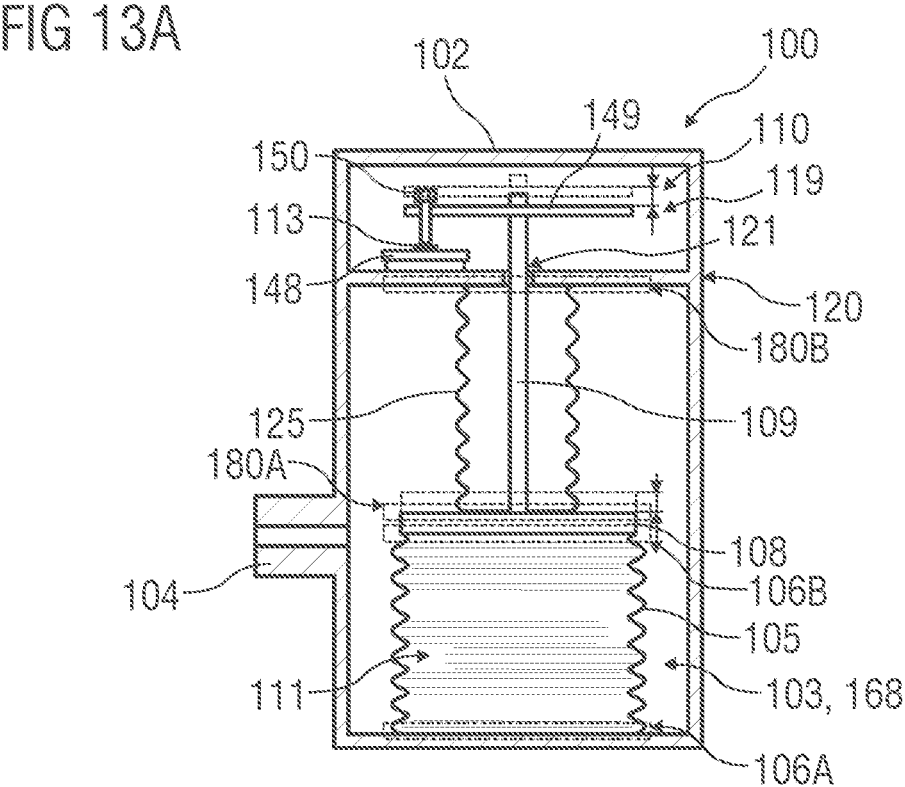

FIGS. 13A and 13B are sectional views of a gas densimeter 100 when it is subjected to various pressures.

Gas densimeter 100 comprises a housing 102, a first housing chamber 103, a coupling 104, a first bellows 105, a separator 108, a transmission element 109, a transmitting and/or monitoring unit 110, a second housing chamber 119, a partition wall 120, and a connection opening 121.

In this case, transmitting and/or monitoring unit 110 is disposed in second housing chamber 119, wherein transmission element 109 is fed through connection opening 121 of partition wall 120 to transmitting and/or monitoring unit 110.

Further, a second bellows 125 is provided, which is connected with a first end section 180A to separator 108 and with a second end section 180B to partition wall 120 and seals second housing chamber 119 against first housing chamber 103.

Transmitting and/or monitoring unit 110 comprises a switching element 113, a carrier element 148, and an actuating element 149 with a contact unit 150.

In FIG. 13A, a first, lower pressure is present within measuring chamber 168 and contact unit 150 and switching element 113 are not in contact. If the pressure within measuring chamber 168 increases, separator 108 with transmission element 109 and the thus indirectly coupled contact unit 150 moves downwards, wherein, when a predetermined pressure value within measuring chamber 168 is exceeded, switching element 113 is actuated by contact unit 150 according to FIG. 13B. The predetermined pressure value is defined, for example, by setting a relative position of contact unit 150 to separator 108.

Figure 14:
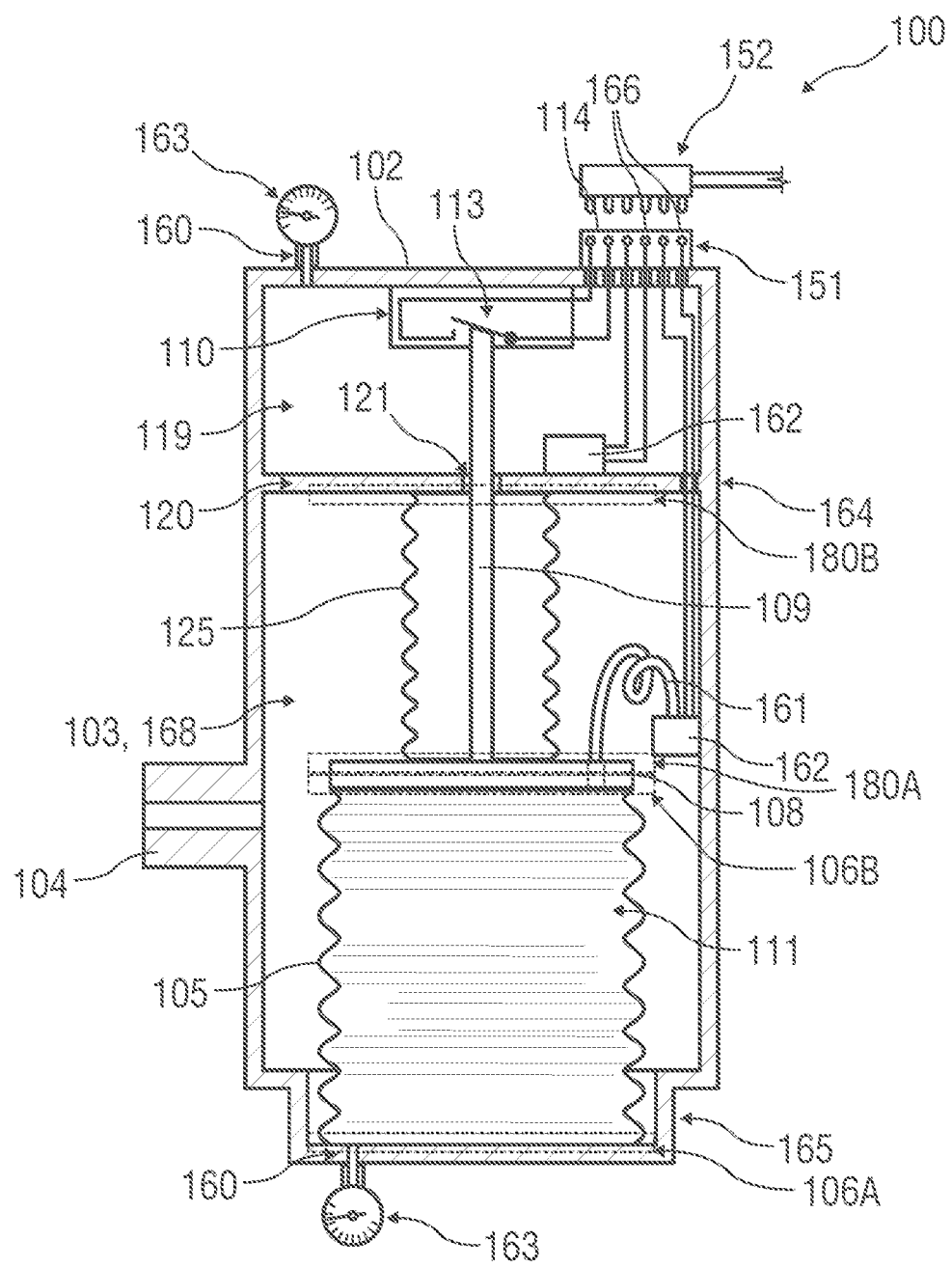
FIG. 14 shows schematically a sectional view of a gas densimeter.

FIG. 14 shows a sectional view of a possible exemplary embodiment of a gas densimeter 100 with two monitoring sensors 162 and two monitoring displays 163.

One of the monitoring sensors 162 is connected to reference chamber 111 via a line 161 to detect a pressure of reference gas 112 present within reference chamber 111. Monitoring sensor 162 is coupled to plug assembly 151 for outputting and/or forwarding the detected values. Further, one of the monitoring displays 163 is connected to reference chamber 111 to detect and display the pressure of reference gas 112 present in reference chamber 111.

The further monitoring sensor 162 is disposed within second housing chamber 119 to detect a pressure within it. Monitoring sensor 162 is coupled to plug assembly 151 for outputting and/or forwarding the detected values. Further, further monitoring display 163 is connected to second housing chamber 119 to detect and display the pressure within it.

By means of such a design, it is possible to detect different fault states. Further, monitoring sensors 162 enable a pressure or density measurement redundant for the measurement with the actual gas densimeter 100, therefore, the mechanical bellows system, and a provision of the detected measured values in electronic form. The operational safety of gas densimeter 100 can be significantly improved thereby.

Figure 15:
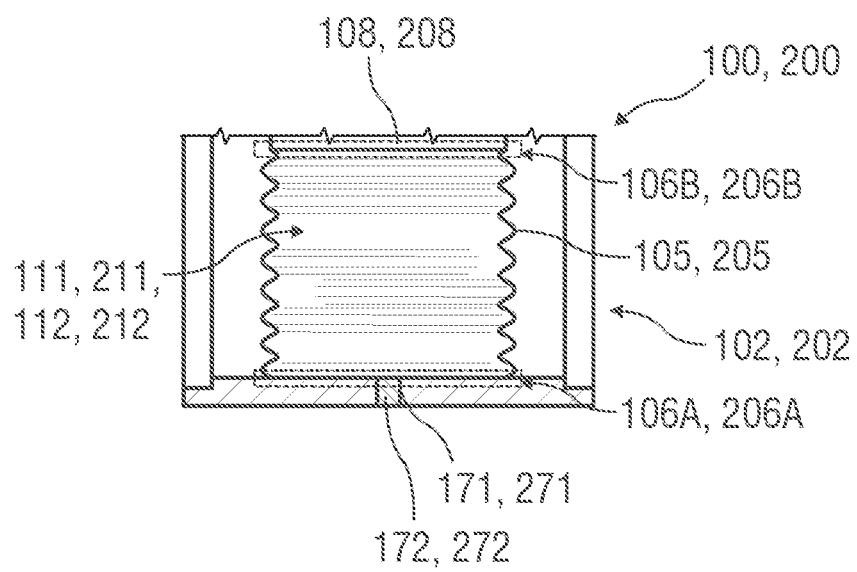
FIG. 15 shows schematically a sectional view of a detail of a gas densimeter.

FIG. 15 shows a sectional view of a detail of a gas densimeter 100, 200, which has a filling opening 171, 271 in a bottom housing wall. Bellows 105, 205, i.e., the reference chamber 111, 211, can be filled with a predetermined amount of reference gas 112, 212 through this filling opening 171, 271. After this filling, filling opening 171, 271 is closed by a closure 172, 272.

Figure 16A:
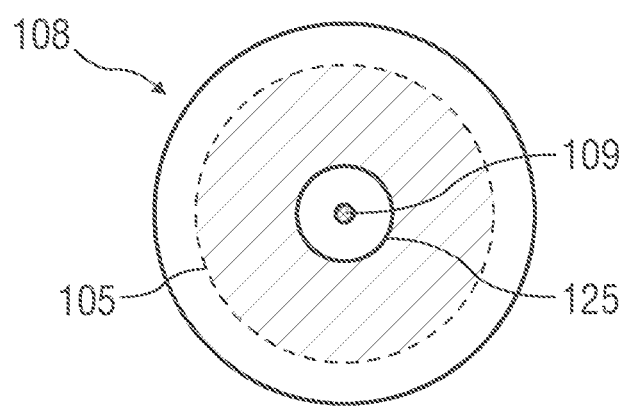
FIGS. 16A and 16B show schematically a view of a separator from two sides.
Figure 16B:
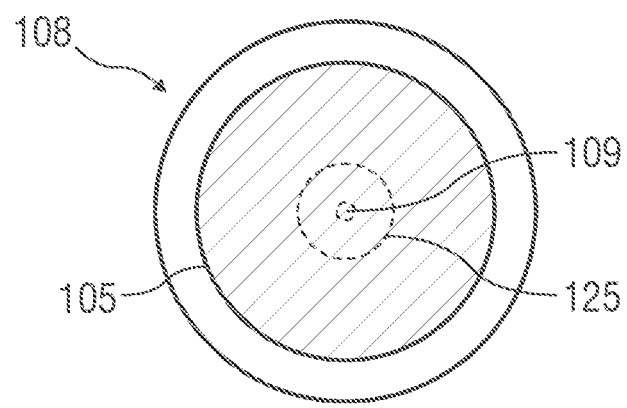

FIGS. 16A and 16B show views of a possible exemplary embodiment of a separator 108 from two sides and various marked areas.

FIG. 16A shows separator 108 according to the second aspect of the invention without a measuring bellows from a first side. Shown hatched is the effective surface against which the gas in measuring chamber 168 can exert a compressive force.

This surface is limited outwardly by the diameter, shown dashed, of bellows 105, i.e., reference chamber 111. Outside reference chamber 111, the compressive forces caused by the gas in measuring chamber 168 against the top and bottom sides of separator 108 cancel each other out.

Inwardly, the surface is limited by the diameter of second bellows 125, i.e., the separating bellows, because the gas in measuring chamber 168 cannot penetrate into separating bellows 125 and therefore also cannot exert any compressive force on the surface section, enclosed by separating bellows 125, of separator 108.

FIG. 16B shows the other side of separator 108. Shown hatched is the surface against which reference gas 112 in reference chamber 111 can exert a compressive force. This is limited only outwardly by the diameter of bellows 105, because reference gas 112 is enclosed within the reference bellows.

It can be seen in a comparison of FIGS. 16A and 16B that reference gas 112 and the gas in measuring chamber 168 exert a compressive force against the surfaces of separator 108 of different sizes. In this case, an effective pressure surface of the gas in measuring chamber 168 is always smaller. Thus, a lower pressure of reference gas 112 in reference chamber 111 than the gas in measuring chamber 168 is sufficient to achieve an equilibrium of forces between the opposing compressive forces.

Figure 17A:
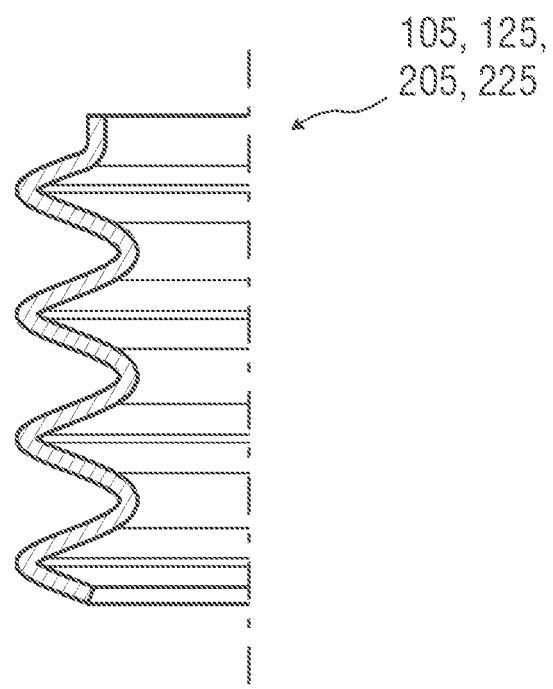
FIGS. 17A to 17C show schematically cross-sectional views of various embodiments of a bellows wall.
Figure 17B:
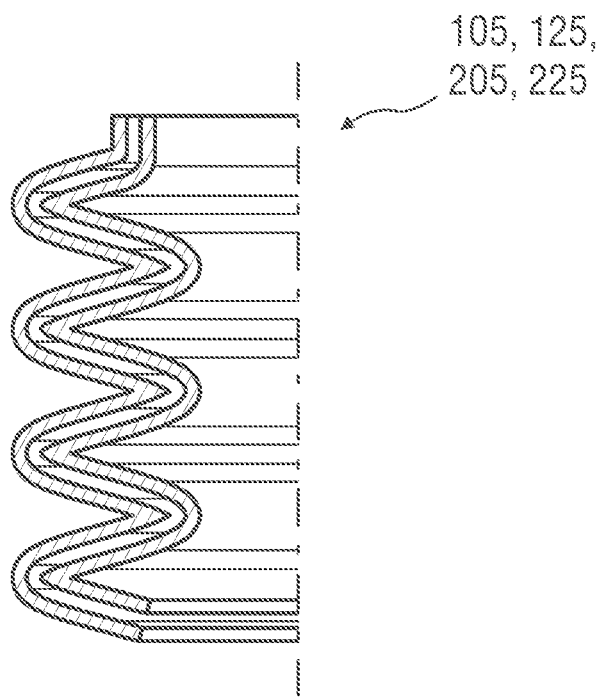
Figure 17C:
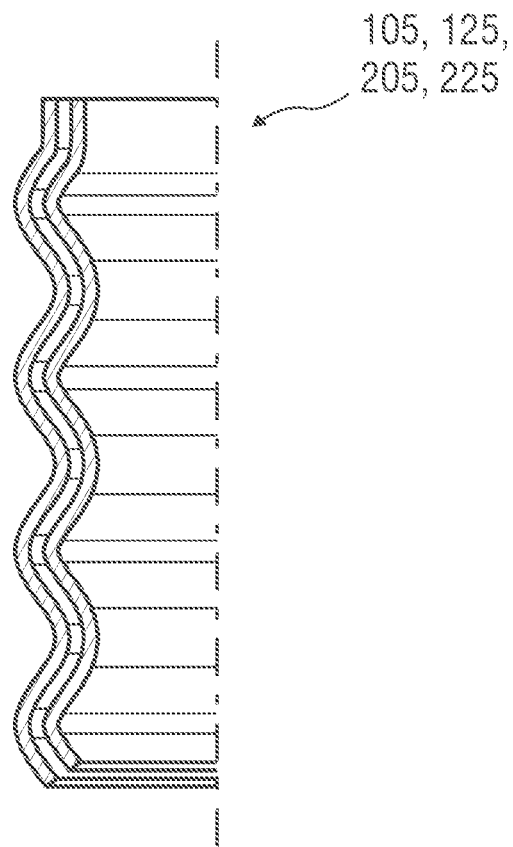

FIGS. 17A to 17C show sectional views of various embodiments of a bellows wall of a bellows 105, 125, 205, 225.

In this case, the bellows wall can be designed as a single bellows wall (FIG. 17A) or as a double bellows wall (FIG. 17B).

In a possible embodiment, an interspace between the individual walls of the double bellows wall is evacuated.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A gas densimeter configured for monitoring a pressure or density of a gas in a gas chamber, the gas densimeter comprising:
a housing having a first housing chamber and a measuring chamber;

a first coupling, via which the measuring chamber is connectable to the gas chamber, the measuring chamber having a gas-permeable connection to the gas chamber via the first coupling;

a reference bellows that is connected directly or indirectly to a transmission element, the reference bellows forming a reference chamber filled with a constant amount of a reference gas;

at least one transmitting and/or monitoring unit that is operatively connected directly or indirectly to the transmission element; and a surface section covering the reference bellows and that is reachable at least partially within the first housing chamber or measuring chamber, the surface section being a measuring surface for the gas from the gas chamber, wherein the surface section covering the reference bellows has an effective measuring surface, the effective measuring surface being smaller by 2% to 80% than a cross-sectional area of the reference bellows or the surface section covering the reference bellows.

2. The gas densimeter according to claim 1, wherein the reference bellows has a diameter of 20 mm to 70 mm.

3. The gas densimeter according to claim 1, wherein the cross sectional area of the reference bellows is perpendicular to an axis of the transmission element, and wherein the cross-sectional area has an area of 3 cm2 to 40 cm2.

4. The gas densimeter according to claim 1, wherein a pressure of the reference gas in the reference bellows in a normal operating state of the gas chamber is lower by 0.05 bar to 2.5 bar than a connected pressure of the gas chamber.

5. The gas densimeter according to claim 1, wherein the reference bellows is completely surrounded gas-tight by the housing or the first housing chamber.

6. The gas densimeter according to claim 1, wherein the at least one transmitting and/or monitoring unit comprises at least one switching element and the at least one switching element is actuated indirectly or directly by the transmission element when a pressure equalization takes place between the measuring chamber and the reference chamber.

7. The gas densimeter according to claim 1, further comprising at least one first spring element, which exerts a spring force on the reference bellows, and which counteracts an extension of the reference bellows, and at least one second spring element, which exerts a spring force on the reference bellows, and which counteracts a compression of the reference bellows.

8. The gas densimeter according to claim 1, further comprising an additional reference bellows.

* * * * *